US012559866B2

(12) United States Patent
Frampton, IV et al.

(10) Patent No.: US 12,559,866 B2
(45) Date of Patent: Feb. 24, 2026

(54) POLYMER STRAND AND PROCESS FOR PRODUCING A POLYMER STRAND

(71) Applicant: 3DBIOFIBR INC., Halifax (CA)

(72) Inventors: John Paul Frampton, IV, Halifax (CA); Gurkaran Chowdhry, Halifax (CA); Samuel James Baldwin, Halifax (CA); Laurent Kreplak, Halifax (CA); Neha Nauman, Halifax (CA)

(73) Assignee: 3DBIOFIBR INC., Halifax (CA)

( * ) Notice: Subject to any disclaimer, the term of this patent is extended or adjusted under 35 U.S.C. 154(b) by 447 days.

(21) Appl. No.: 18/021,029

(22) PCT Filed: Aug. 12, 2021

(86) PCT No.: PCT/CA2021/051110

§ 371 (c)(1),
(2) Date: Feb. 13, 2023

(87) PCT Pub. No.: WO2022/032387

PCT Pub. Date: Feb. 17, 2022

(65) Prior Publication Data

US 2023/0313417 A1 Oct. 5, 2023

Related U.S. Application Data

(60) Provisional application No. 63/066,154, filed on Aug. 14, 2020.

(51) Int. Cl.

| | |
|---|---|
| *C08L 71/02* | (2006.01) |
| *C08L 89/00* | (2006.01) |
| *D01D 5/12* | (2006.01) |
| *D01F 4/00* | (2006.01) |
| *D01F 6/66* | (2006.01) |

(52) U.S. Cl.

CPC ............... *D01D 5/12* (2013.01); *C08L 71/02* (2013.01); *C08L 89/00* (2013.01); *D01F 4/00* (2013.01); *D01F 6/66* (2013.01); *D10B 2211/06* (2013.01); *D10B 2331/06* (2013.01)

(58) Field of Classification Search

CPC ... D01D 5/12; D01D 5/00; D01D 5/02; D01F 6/94; D01F 6/66; D01F 4/00; C08L 71/02; C08L 89/00; C08L 89/06; D10B 2211/06; D10B 2331/06; C08J 2371/02; C08J 2389/06; C08J 5/00

USPC ........................................................ 523/222

See application file for complete search history.

(56) References Cited

U.S. PATENT DOCUMENTS

| | | | |
|---|---|---|---|
| 8,124,001 B1 | 2/2012 | Wen et al. | |
| 8,580,181 B1 | 11/2013 | Beachley et al. | |
| 9,029,149 B2 | 5/2015 | Nain | |
| 9,753,023 B2 | 9/2017 | Nain et al. | |
| 9,902,932 B2 | 2/2018 | Nain | |
| 10,663,378 B2 | 5/2020 | Beachley | |
| 11,299,630 B2 * | 4/2022 | Frampton, IV | A61L 15/60 |
| 2012/0040461 A1 | 2/2012 | Beachley et al. | |
| 2018/0291527 A1 | 10/2018 | Beachley | |
| 2019/0017194 A1 | 1/2019 | Rhee | |
| 2019/0145022 A1 | 5/2019 | Jao et al. | |

FOREIGN PATENT DOCUMENTS

| | | |
|---|---|---|
| CA | 2789647 C | 4/2016 |
| CN | 106637679 A | 5/2017 |
| EP | 0238342 A2 | 9/1987 |
| JP | S162238806 A | 10/1987 |
| JP | 2007056388 A | 3/2007 |
| JP | 2011214174 A | 10/2011 |
| JP | 5320726 B2 | 10/2013 |
| JP | 2019214813 A | 12/2019 |
| WO | 2013/172788 A1 | 11/2013 |
| WO | 2015/066408 A1 | 5/2015 |
| WO | 2015/069742 A1 | 5/2015 |
| WO | 2015/102980 A1 | 7/2015 |
| WO | 2016/168821 A1 | 10/2016 |

(Continued)

OTHER PUBLICATIONS

Colby RH, et al. Macromolecules (1991) 24, 3873-3882.
Colby RH. Rheol Acta (2010) 49:425-442.
Dobrynin AV, et al. Macromolecules 2021, 54, 2288-2295.
Guo L, et al. Journal of Food and Nutrition Research (2016) vol. 4, No. 11, 750-759.
Extended European Search Report dated Sep. 22, 2025 on Wuropean application 21855022.6.
Chowdhry G, et al. Soft Matter. (Feb. 25, 2021) 17, 1873-1880.
Office action dated Apr. 1, 2025 on Japanese application 2023-511837.

(Continued)

*Primary Examiner* — Hannah J Pak

(74) *Attorney, Agent, or Firm* — Brunet & Co. Ltd.; Robert Brunet; Hans Koenig

(57) ABSTRACT

A process for producing a polymer strand involves: inserting a nucleation element into a pre-strand composition, the pre-strand composition comprising a polymer mixed with a solvent, the polymer having a concentration in the pre-strand composition that is greater than or equal to an overlap concentration (c*) of the polymer in the pre-strand composition; and, withdrawing the nucleation element from the pre-strand composition so that a strand comprising the polymer is pulled by the nucleation element from the pre-strand composition, the nucleation element being withdrawn at a rate such that a pull time ($\tau_{pull}$) of the nucleation element is less than reptation time ($\tau_{rep}$) required to relax polymer entanglements in the pre-strand composition, thereby inducing a viscoelastic response in the pre-strand composition as the strand is pulled by the nucleation element from the pre-strand composition.

19 Claims, 24 Drawing Sheets

(56)               References Cited

FOREIGN PATENT DOCUMENTS

| WO | 2016/172531 A1 | 10/2016 |
| WO | 2018/137041 A1 | 8/2018 |

OTHER PUBLICATIONS

Tokarev A, et al. Adv. Mater. 2015, 27, 6526-6532.

Lee H, et al. Polymers 2018, 10, 980; doi:10.3390/polym10090980.

Lee H, et al. Mechanical Force for Fabricating Nanofiber. (2018) Mechanical Force for Fabricating Nanofiber http://dx.doi.org/10.5772/intechopen.73521.

International Search Report and Written Opinion dated Oct. 22, 2021 on PCT/CA2021/051110.

Bajakova J, et al. The Production of Individual Nanofibers by Experimental Method. NanoCon, Sep. 21-23, 2011, Brno, Czech Republic.

Chowdhry G. Liquid Bridge to Stable Fibre: Polymer Entanglement Drives Fibre Formation From Highly Concentrated Dextran Solutions. MSc. Thesis, Dalhousie University, Oct. 2020.

Chowdhry G, et al. Soft Matter, 2021, 17, 1873.

Colby RH. Structure and Linear Viscoelasticity of Flexible Polymer Solutions: Comparison of Polyelectrolyte and Neutral Polymer Solutions.

Ebagninin KW, et al. Journal of Colloid and Interface Science 336 (2009) 360-367.

Gao J, et al. Fibers and Polymers. 18(8), 1496-1503 (2017).

Huang L, et al. J. Biomater. Sci. Polymer Edn, vol. 12, No. 9, pp. 979-993 (2001).

Jao D, et al. Rowan University Case ID 180521. Automated Aligned Fiber Track Collector for Centrifugal Spinning. Jan. 15, 2020.

Koenig K, et al. Biomaterials Research (2019) 23:10.

Lee H, et al. Mechanical Force for Fabricating Nanofiber. IntechOpen. http://dx.doi.org/10.5772/intechopen.73521 (2018).

Lee H, et al. Polymers 2018, 10, 980.

Leon-Lopez A, et al. Molecules 2019, 24, 4031.

Liao S, et al. Adv. Sci. 2017, 4, 1600480.

Liu GY, et al. Scientific Reports. 7: 9628 (2017).

Ma J, et al. Applied Physics Letters 109, 033101 (2016).

Nain AS, et al. IEEE Transactions on Nanotechnology. 5(5), 499-510 (2006).

Nain AS, et al. Macromol. Rapid Commun. 2009, 30, 1406-1412.

Abstract of Nasir NFBM, et al. 3rd Kuala Lumpur International Conference on Biomedical Engineering. (2006) pp. 680-683.

Tamayol A, et al. Adv Health Mater. Oct. 2015 ; 4(14): 2146-2153.

Xing X, et al. Optics Express. (2008) 16(14), 10815-10822.

Yaari A, et al. ACS Biomater. Sci. Eng. (2016) 2(3), 349— Supporting Information.

Yadavalli NS, et al. Small 2020, 16, 1907422.

Heseltine PL, et al. Macromol. Mater. Eng. 2018, 303, 1800218.

Hong X, et al. ACS Omega 2018, 3, 5470-5479.

Mahalingam S, et al. Macromol. Rapid Commun. 2013, 34, 1134-1139.

Nam E, et al. Macromol. Biosci. 2016, 16, 995-1000.

Zhang S, et al. Macromol. Rapid Commun. 2015, 36, 1322-1328.

Zhao X, et al. Carbohydrate Polymers 148 (2016) 98-106.

Zhao X, et al. Appl. Sci. 2018, 8, 1226.

Office action dated Nov. 6, 2025 on Japanese application 2023-511837.

* cited by examiner

| 0% | 500±230 nm | 30% | 620±170 nm | 50% | 550±180 nm |
|---|---|---|---|---|---|
| 70% | 570±140 nm | 80% | 760±170 nm | 90% | 640±330 nm |

| Collagen % | Diameter (um) |
| --- | --- |
| 30% | 3±1.0 |
| 50% | 12±5.0 |
| 70% | 4.5±1.7 |
| 80% | 2.1±.4 |
| 90% | 1.4±.4 |

POLYMER STRAND AND PROCESS FOR PRODUCING A POLYMER STRAND

CROSS-REFERENCE TO RELATED APPLICATIONS

This application is a national entry of PCT/CA2021/051110 filed Aug. 12, 2021 and claims the benefit of United States Provisional Application USSN 63/066,154 filed Aug. 14, 2021, the entire contents of both of which are herein incorporated by reference.

FIELD

This application relates to polymer strands and processes and pre-strand compositions for producing polymer strands, as well as uses of the polymer strands and articles made from the polymer strands.

BACKGROUND

In creating bioactive strands for biomaterials, many popular techniques are unable to produce strands without damaging the biomolecules to be incorporated into the strands, while maintaining production rates sufficient for practical applications. For example, while electrospinning can produce strands with collagen at length scales similar to native collagen found in the human body, this method requires highly specialized equipment, uses volatile solvents that can denature the collagen, and exposes the strands to high shear stresses which can damage the collagen molecules. Similar problems with electrospinning exist for other bioactive molecules. Wet extrusion can be used to produce self-assembling collagen strands without the use of high shear rates or volatile solvents, but this process is extremely slow, generally producing a single thick strand at a time. Moreover, both electrospinning and wet spinning processes have limited ability to produce strands that incorporate macromolecules, supramolecular assemblies and nano/micro particulates because they rely on extrusion through small gauge nozzles or needles that become easily clogged.

There remains a need for a process for producing polymer strands that provides one or more of improved throughput, longer strand lengths, controllable strand diameter, controllable strand cross-sectional profile, the ability to incorporate additive within the strand and use of simpler equipment that is amenable to automation.

SUMMARY

A process for producing a polymer strand has been developed, the process comprising: inserting a nucleation element into a pre-strand composition, the pre-strand composition comprising a polymer mixed with a solvent, the polymer having a concentration in the pre-strand composition that is greater than or equal to an overlap concentration (c*) of the polymer in the pre-strand composition; and, withdrawing the nucleation element from the pre-strand composition so that a strand comprising the polymer is pulled by the nucleation element from the pre-strand composition, the nucleation element being withdrawn at a rate such that a pull time $(\tau_{pull})$ of the nucleation element is less than a reptation time $(\tau_{rep})$ required to relax polymer entanglements in the pre-strand composition, thereby inducing a viscoelastic response in the pre-strand composition as the strand is pulled by the nucleation element from the pre-strand composition.

The process may further comprise depositing the polymer strand on a solid substrate.

In an aspect, a process for producing a multifilament strand of polyethylene oxide (PEO) and collagen is provided, the process comprising: inserting a nucleation element into a pre-strand composition comprising PEO and collagen mixed with a solvent; and, withdrawing the nucleation element from the pre-strand composition so that a multifilament strand comprising PEO and collagen filaments is pulled by the nucleation element from the pre-strand composition.

An article of manufacture may comprise a polymer strand produced by the process.

In one aspect, a composition for forming polymer strands comprises poly(ethylene oxide) having a weight average molecular weight ($M_w$) of 100 kDa or greater, dissolved in an aqueous solvent and at a concentration of poly(ethylene oxide) greater than an overlap concentration (c*) of the poly(ethylene oxide) in the composition.

Polymer strands of the present invention are useful in a variety of applications, including as stand-alone fibers, and as fibers in woven and non-woven materials, as well as in hydrogels and the like. Some examples of applications include cell culture extracellular matrix materials (e.g., 2D and 3D cell culture and tissue regeneration support materials), medical devices (e.g., bandages, sutures, surgical meshes, and implanted tissues such as tendons), textiles (e.g., for face masks and textiles for the fashion industry and protective apparel) and biocomposites containing high value additives. Articles such as thread, yarn, multifilament fibers, woven fabric, knitted fabric, other non-woven fabric (e.g., felt and the like) or combinations thereof can be made from polymer strands produced by the process. Strand orientations in a mesh article may be parallel (0°), orthogonal (90°), between 0° and 90°, or multi-directional. In one application, polymer fiber network constructs of the polymer strands can be formed on a solid substrate by incorporating the polymeric strands on or within a solid substrate. The solid substrate may comprise, for example, a textile formed from other natural or synthetic strands, a hydrogel matrix, glass, polydimethylsiloxane (PDMS), polystyrene, a thermoplastic polyolefin, a thermoplastic polyurethane, or other thermoplastic elastomers. The hydrogel matrix may comprise a porous or non-porous polyacrylamide hydrogel matrix or agarose hydrogel matrix, which may or may not be activated with 3-(aminopropyl)triethoxysilane, glutaraldehyde, sulfosuccinimidyl 6-(4'azido-2'-nitrophenylamino)hexanoate) (sulpho-SANP AH), other suitable surface functionalization molecules or any combination thereof.

The process herein is simpler to implement, can incorporate bioactive molecules while retaining at least some of the biological activity of the bioactive molecules, and has production rates adequate for large-scale manufacturing. The process permits designing efficient production processes for a variety of different kinds of polymer strands having a desired length and/or diameter and/or cross-sectional shape. Using the process, polymer strands can be produced at a throughput that is faster than electrospinning and wet spinning.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1:
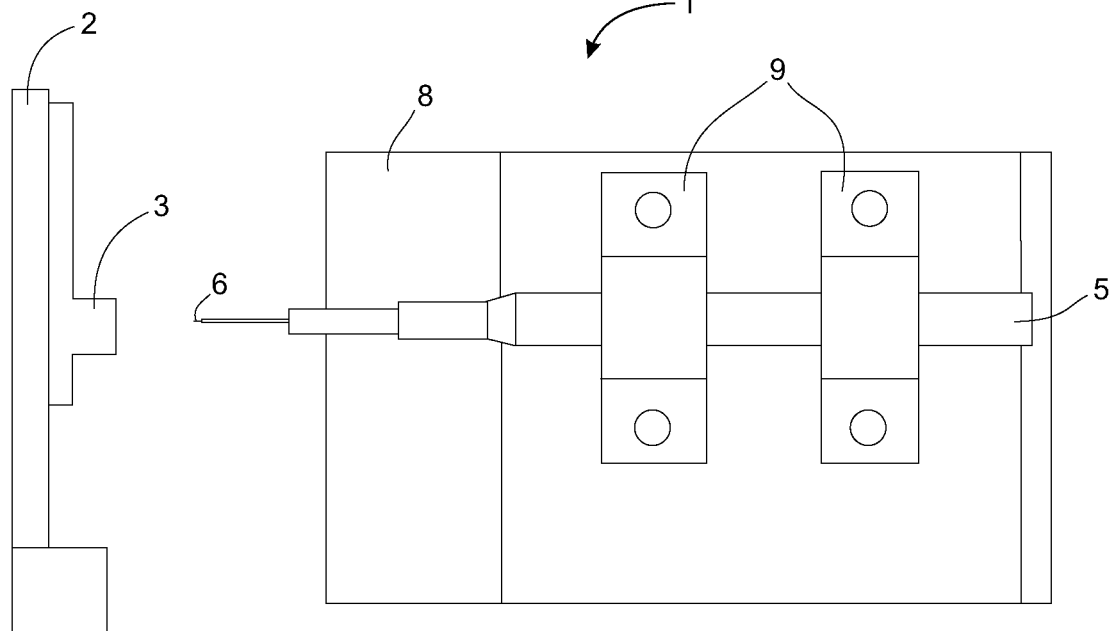
FIG. 1 depicts a schematic diagram of an apparatus for producing a polymer strand.

The process comprises contact drawing of a polymer strand from a pre-strand composition (i.e., a spin dope) comprising a polymer mixed with a solvent. The polymer in the pre-strand composition nucleates on a nucleation element that is inserted into the pre-strand composition, and as the nucleation element is withdrawn from the pre-strand composition, the polymer molecules entangle leading to the formation of a liquid bridge at an interface between a surface of the pre-strand composition and an atmosphere outside the surface of the pre-strand composition. By continuing to withdraw the strand at an appropriate speed, more of the polymer in the pre-strand composition is pulled out of the pre-strand composition by the strand thereby lengthening the strand being pulled. Provided a continuous supply of the pre-strand composition, strands of indefinite length can be pulled by the process.

The pre-strand composition comprises a polymer mixed with a solvent. Preferably, the polymer is either dissolved in the solvent to form a solution or mixed with solvent to form a paste.

The solvent preferably comprises a polar solvent, for example water, an alcohol (e.g., primary alcohols such as methanol, ethanol, 1-propanol, 1-butanol, 1-pentanol and the like, secondary alcohols such as 2-propanol, or tertiary alcohols such as tert-butanol and the like), and mixtures thereof. An aqueous solvent is preferred. The pH of an aqueous solvent may be adjusted with the addition of an acid or a base. Bases include, for example, hydroxides, carbonates, bicarbonates, and the like, and mixtures thereof. Acids include, for example, mineral acids (e.g., HCl, $H_2SO_4$, $HNO_3$, $H_3PO_4$ and the like) or organic acids (e.g., acetic acid, citric acid, succinic acid, trifluoroacetic acid/2,2,2-trifluoroethanol and the like, and mixtures thereof). The aqueous solvent may further include salts or other additives, especially salts or other additives commonly used in biochemistry, for example in cell culture. Salts or other additives may include, for example, saline (e.g., physiological saline), buffers (e.g., tris buffer, tris-buffered saline, phosphate buffer, phosphate buffered saline), plasma, lactated Ringer's solution, Ringer-acetate solution, tissue culture media or mixtures thereof. In some embodiments, the pH of the solvent may be adjusted to be acidic, neutral or basic, depending on the polymer.

The polymer can be any polymer having appropriate solubility in the solvent and molecular weight to be withdrawable from the solvent by the nucleation element under the process conditions. Strands may be formed from synthetic or naturally occurring polymers. Some polymers include polysaccharides (e.g. dextran, chitosan, carrageenan, cellulose and the like), polypeptides (e.g. collagen, spider silk, *Bombyx mori* silk, other insect silks and the like), poly(ethylene oxide) (PEO), polyvinyl alcohol (PVA), polyethylene glycol (PEG), hydroxypropyl cellulose, poly(2-ethyl-2-oxazoline) (P2E2O), poly(4-styrenesulfonic acid-co-maleic acid), poly(acrylic acid), poly(diallyldimethyl ammonium chloride), poly(methacrylic acid), poly(methyl vinyl ether-alt-maleic acid), poly(vinylpyrrolidone) (PVP), crosslinked polymers thereof and copolymers thereof.

A particularly useful group of polymers are those polymers that can act as a scaffold for other chemical entities that cannot be pulled as strands or are challenging to pull as strands. Some examples of scaffold polymers include dextran, PEO, PVA, PEG, hydroxypropyl cellulose, poly(2-ethyl-2-oxazoline), poly(4-styrenesulfonic acid-co-maleic acid), poly(acrylic acid), poly(diallyldimethyl ammonium chloride), poly(methacrylic acid), poly(methyl vinyl ether-alt-maleic acid), poly(vinylpyrrolidone) (PVP), low-density polyethylene (LDPE), high-density polyethylene (HDPE), polypropylene (PP), polyvinyl chloride (PVC), polystyrene (PS), nylon, polytetrafluoroethylene, thermoplastic polyurethanes, crosslinked polymers thereof and copolymers thereof.

One or more other chemical entities may be present in the pre-strand composition. During the process of forming the strand, the other chemical entities become entrained or doped in or on the polymer strand as the strand is formed. Some examples of other chemical entities that can be supported on the scaffold polymers include collagen, gelatin, enzymes, actin, tubulin, keratins, amino acids, spider silks, *B. mori* silk, elastin, laminin, fibronectin, resilin, abductan, fibrin, integrin receptor ligands, fibulin, globulin, thrombin, glycoproteins, proteoglycans, DNA, RNA, nucleotides, carrageenan, chitin, chitosan, cellulose, saccharides, growth factors, hormones, cytokines, chemokines, antibodies, lipids, hyaluronic acid, metallic ions, non-metallic ions, nanoparticles (e.g. carbon nanotubes, metallic nanoparticles), colorants, surfactants, detergents, vitamins, bases, mineral and organic acids (e.g., citric acid), other natural health products, other small molecule pharmaceuticals (e.g., minocycline, riluzole, dalfampridine, escitalopram, deoxygedunin, 7,8-dihydroxflavone, quercetin, dexamethasone, tacrolimus) and combinations thereof.

In the case of other chemical entities that are also polymeric entities and can form strands, the resulting polymeric strand may comprise multifilament strands of two or more polymers whereby the strand of the scaffold polymer supports polymeric strands of the other polymeric chemical entity or entities. In this way, long strands of various polymers can be formed where it was hitherto impossible or more difficult to form polymer strands thereof. Multifilament strands allow for the deployment of commercial spinning-draw-wind machines, braiding, weaving and knitting machines and those machines used to manufacture medical devices e.g., sutures, woven fabrics, braider small diameter vascular grafts or tendons. In some embodiments, the other chemical entities may comprise monomers, which are polymerized before, during or after strand formation to provide a polymer strand comprising a polymer supported on the scaffold polymer. In some embodiments, the scaffold polymer can be separated, for example mechanically or by application of a wash solvent in which the scaffold polymer is soluble but the other polymer is not, to leave a thin strand of the other polymer.

The one or more other chemical entities are present in the pre-strand composition in an amount that is suitable for the purpose of the other chemical entity in the polymer strand. Preferably, the one or more other chemical entities are present in the pre-strand composition at a concentration in a range of 0.1-50 wt %, based on the total weight of the pre-strand composition. In some embodiments, the concentration of the one or more other chemical entities in the pre-strand composition is 0.1-30 wt %, or 0.2-30 wt %, or 0.2-5 wt %, or 0.2-9 wt %, or 0.3-20 wt %, or 0.3-10 wt %, or 0.3-9 wt %, or 0.3-8 wt %, or 0.3-5 wt %, or 0.3-3 wt %, or 0.4-10 wt %, or 0.5-9 wt %, or 0.5-8 wt %, or 0.5-5 wt %, or 0.5-3 wt %.

The pre-strand composition may further comprise a stabilizing compound for the polymer strand. The stabilizing compound is preferably a cross-linking agent for the polymer strand. Some examples of stabilizing compounds include glyoxal, 1-ethyl-3-(3-dimethylaminopropyl)carbodiimide (EDC), an aldehyde (e.g., formaldehyde, glutaraldehyde), a free radical generating cross-linking agent or mixtures thereof.

Overlap concentration (c*) of a polymer in the pre-strand composition is the minimum concentration of the polymer in the pre-strand composition where conformations of individual polymer chains start to overlap each other. This is the point where the concentration within a given pervaded volume is equal to the concentration of the polymer in the pre-strand composition. The concentration of the polymer in the pre-strand composition is greater than or equal to the overlap concentration.

Entanglement concentration ($c_e$) of a polymer in the pre-strand composition is the concentration of the polymer in the pre-strand composition where individual polymer chains start to entangle with each other. The entanglement concentration is always at least as high as the overlap concentration but can be up to as much as 1000 times greater than the overlap concentration. The entanglement concentration is often at least 10 times greater than the overlap concentration. The concentration of the polymer in the pre-strand composition is preferably greater than or equal to the entanglement concentration. Preferably, concentration of the polymer in the pre-strand composition is sufficiently high such that the entire pre-strand composition is in the entangled regime.

The concentration of the polymer is preferably at least 0.01 wt %, more preferably in a range of 0.01 wt % to 99 wt %, based on total weight of the pre-strand composition. In some embodiments, the polymer is present in the pre-strand composition in amount of at least 7 wt %, based on total weight of the pre-strand composition, preferably 7-14 wt %, more preferably 8-14 wt % or 7-10 wt %. In some embodiments, e.g., collagen Type I, the concentration of the polymer in the pre-strand composition is 40 wt % or more, for example 40-95 wt % or 40-65 wt %. In other embodiments, e.g., PEO, the concentration of the polymer in the pre-strand composition is 0.5 wt % or more, for example 0.5-70 wt %. The required concentration of the polymer depends to some extent on the molecular weight ($M_w$) of the polymer. In general, lower concentration is required for polymers with higher molecular weight.

The polymer preferably has a molecular weight ($M_w$) of 1 kDa or more, or 5 kDa or more, or 10 kDa or more, or 35 kDa or more, or 40 kDa or more, or 50 kDa or more, or 70 kDa or more, or 100 kDa or more, or 1,000 kDa or more, or 8,000 kDa or more. In some embodiments, the polymer has a molecular weight ($M_w$) of 20,000 kDa or less. Generally, higher molecular weight polymers lead to the ability to produce longer polymer strands.

Reptation time ($\tau_{rep}$) of a polymer in the pre-strand composition is the time required to relax polymer chain entanglements in the pre-strand composition. The reptation time is as long as possible to be able to increase pull time, and should be less than the desired pull time. The reptation time is preferably at least 0.01 second, more preferably at least 0.1 second.

Pull time ($\tau_{pull}$) of the nucleation element from the pre-strand composition is defined as $\tau_{pull}$=path length/pull rate, where path length is a set distance over which the nucleation element will pull the polymer strand and pull rate is the speed at which the nucleation element will pull the strand over the set distance. Pull time ($\tau_{pull}$) can instead be defined in relation to the strand instead of the nucleation element, where pull time ($\tau_{pull}$) of the strand from the pre-strand composition is defined as $\tau_{pull}$=length of strand/pull rate, where length of strand is a set length to which the polymer strand is pulled and pull rate is the speed that the strand is pulled over that length. Pull time ($\tau_{pull}$) of the strand is the same as $\tau_{pull}$ of the nucleation element when the strand is connected to the nucleation element. Defining $\tau_{pull}$ in relation to the strand is useful when the strand is transferred from the nucleation element to a strand winding mechanism, which is preferable in a continuous strand forming process.

In the process, the pull time of the nucleation element (or the strand when the strand is not connected to the nucleation element) is less than the reptation time ($\tau_{rep}$) of the polymer. Having a pull time less than the reptation time ($\tau_{rep}$) of the polymer induces a viscoelastic response in the pre-strand composition as the strand of the polymer is pulled from the pre-strand composition. Therefore, at pull times shorter than the reptation time, entanglements act as temporary crosslinks and a viscoelastic response occurs thereby permitting the polymer strand to be pulled from the pre-strand composition without breaking. However, if the interaction time of the nucleation element or an already forming strand with an entangled polymer in the pre-strand composition is greater than the reptation time, entanglements are abandoned and the strand breaks. The pull time is preferably selected to maximize the length of the strand for the desired pull rate. The pull rate is preferably in a range of 0.1-4 m/s, or 0.5-4 m/s, or 0.5-3 m/s or 0.5-2 m/s.

Polymer strands may be pulled in any direction relative to direction of gravity, for example up, down or sideways. Pulling polymer strands downward is preferred because the action of gravity on the pre-strand composition helps maintain a stable spin cone during the pulling process, thereby permitting the formation of longer polymer strands. The spin cone is a volume of pre-strand composition that points outwardly from the surface of the pre-strand composition during pulling (spinning).

Using the process, practically unlimited polymer strand lengths can be achieved by continuously replenishing the pre-strand composition from which the strand is being pulled. Strand lengths of up to 10 m or more, or even 100 m or more can be achieved. In some embodiments, the strand length is in a range of 0.01-100 m. In some embodiments, the strand length is in a range of 0.01-15 m or 0.01-10 m. In some embodiments, the strand length can be 10 cm or more, or 50 cm or more, or 1 m or more, or 10 m or more.

Bulk viscosity of the pre-strand composition can be tailored to control strand diameter as lower bulk viscosity leads to thinner strands. As the bulk viscosity of the pre-strand composition is increased, thicker strands can be formed. However, if the viscosity of the pre-strand composition is too low, the spin cones collapse breaking the growing strand, and if the viscosity is too high, the spin cone will not contain a sufficient volume of fluid to allow strand formation. Therefore, it is important to properly set the viscosity of the pre-strand composition. In some embodiments, the bulk viscosity of the pre-strand composition is preferably in a range of 8-100 Pa·s (8,000 cP to 100,000 cP), as measured by a vertical falling ball method. In other embodiments, the bulk viscosity of the pre-strand solution is preferably in a range of 100-5,000 Pa·s (100,000-5,000,000 cp), more preferably 100-1,000 Pa·s (100,000-1,000,000 cp), even more preferably 100-400 Pa·s, yet more preferably 150-300 Pa·s, and yet even more preferably 175-250 Pa·s, for example 200 Pa·s, as measured with a StressTech™ HR rheometer. When the polymer comprises PEO, the bulk viscosity is preferably 100-400 Pa·s, more preferably 150-300 Pa·s, even more preferably 175-250 Pa·s, or 150-200 Pa·s, for example 200 Pa·s.

Bulk viscosity of the pre-strand composition is affected by the concentration of the polymer in the pre-strand composition. Raising the concentration of the polymer in the pre-strand composition increases the bulk viscosity while lowering the concentration decreases the bulk viscosity. Tailoring the concentration of the polymer in the pre-strand composition therefore tailors the diameter of the strand produced. Average strand diameters in a range of 20-20,000 nm can be achieved by appropriate tailoring of the viscosity of the pre-strand composition. A significant benefit of the process is the ability to produce an ultrafine strand having an average strand diameter of 200 nm or less, for example 20-200 nm. Further, strand diameter remains relatively constant over the length of the strand.

Different cross-sectional shapes for the strand are obtainable in the process. For example, the strand may have a cross-section that is circular or elliptical. An entire strand may have one cross-sectional shape, or different sections of the strand may have different cross-sectional shapes. Thus, ribbons and strands of other architectures may be produced.

The nucleation element may be any object on which the strand can nucleate when the element is inserted into the pre-strand composition. Nucleation of the strand results in adherence of some of the pre-strand composition, for example in the form of a drop, at one or more nucleation sites on the nucleation element. As the nucleation element is withdrawn from the pre-strand composition, a liquid bridge is formed between the pre-strand composition on the nucleation element and the pre-strand composition remaining in a reservoir, with the polymer strand forming between the nucleation element and the reservoir as the nucleation element is further pulled away from the reservoir. The nucleation element provides for non-random nucleation of the polymer. With non-random nucleation, the one or more nucleation sites may be pre-determined for better control over strand growth and other process steps. The nucleation element has a size and shape such that the polymer forms a strand as the nucleation element is withdrawn from the pre-strand composition. Aspect ratio (height to maximum width) of the nucleation element is preferably in a range of from 1:100 to 1000:1. In some embodiments, the aspect ratio is preferably in a range of 1:1 to 1000:1. The nucleation element preferably has a cap of sufficiently small width to permit the initial adherence of a thin polymer strand thereon when the cap is inserted into the pre-strand composition. The width of the nucleation element where the polymer strand adheres is preferably 0.5-4 mm, more preferably 2-4 mm. In some embodiments, the width of the nucleation element may be 1 mm or less, or 0.75 mm or less, for example 0.5 mm. The cap preferably has geometry that is flat, conical, pyramidal or ellipsoidal.

The nucleation element has a surface, and the nucleation element is preferably inserted into the pre-strand composition so that the surface of the nucleation element is wetted over a surface area of at least 11 mm$^2$, preferably at least 50 mm$^2$. Preferably, the wetted surface area is up to 400 mm$^2$, more preferably up to 200 mm$^2$, even more preferably up to 110 mm$^2$. Preferably, the wetted surface area is in a range of 11-400 mm$^2$, more preferably 11-200 mm$^2$, even more preferably 11-110 mm$^2$, yet more preferably 50-110 mm$^2$, even yet more preferably 60-90 mm$^2$.

For pulling one polymer strand, a single nucleation element may be used. However, a plurality of strands may be pulled simultaneously from the same pre-strand composition by using a plurality of discrete nucleation elements. The plurality of nucleation elements may be provided in an array, either a regular array or an irregular array, with regular or random spacing. Where a plurality of nucleation elements is used, the plurality of nucleation elements preferably has a minimum center-to-center spacing between nucleation elements of at least 1.5 times, preferably at least 2 times, more preferably at least 2.5 times, a diameter of a thickest neighboring nucleation element. In some embodiments, the spacing is at least 0.2 mm, preferably at least 0.5 mm, more preferably at least 1 mm. The lower limits arise primarily due to the resolution of 3D printers and tolerances that can be achieved by machining. The desired strand thickness will also inform the minimum spacing as well as the width of the nucleation elements. Greater pin spacing and/or wider nucleation elements may be required for thicker strands. The nucleation elements may be manufactured by any suitable method, for example 3D printing or machining. The nucleation elements may have any suitable geometry, for example polygonal or elliptical in cross section. Some examples of nucleation elements include a pin, a needle, a rod and a protrusion (e.g., a pillar, a ridge, a nodule, a granule or the like) on a surface. In some embodiments, a plurality of one or more types of such nucleation elements are mounted on a base and used to pull multiple strands at the same time. Thus, pin brushes, sandpaper, textured gloves, roughened surfaces and the like may be used to pull a plurality of strands simultaneously.

The nucleation element may be embodied in an apparatus that contains features for mounting or tethering the nucleation element, containing the pre-strand composition and translating the nucleation element into and out of the pre-strand composition. In some embodiments, the nucleation element is mounted on and protrudes from a flat plate. In some embodiments, the pre-strand composition is contained in a shallow pool on a flat plate. During strand formation, the flat plates face each other and may be oriented such that the plates stand vertically whereby the nucleation element extends horizontally, or horizontally such that the nucleation element extends vertically. In the horizontal orientation, the flat plate containing the pre-strand composition is preferably below the flat plate holding the nucleation element. The flat plates preferably have a minimum base area of 1 cm$^2$, while a maximum base area is limited only by operational desires for producing the strand. As such, the maximum base area can be as high as multiple square meters or more. Other mounting and containing arrangements can be envisioned by one skilled in the art. Features for translating the nucleation element may include a motorized or hand driven stage. Automated apparatuses are preferred.

After strand nucleation on the nucleation element, the strand may be transferred from the nucleation element to a strand winding mechanism (e.g., a continuous spinning apparatus, such as a Godet) that is capable of continuously pulling and collecting the strand. In this manner, a strand of indeterminate length can be produced.

In one embodiment as shown in FIG. 1, an apparatus 1 for producing a polymer strand from a pre-strand composition comprises a 3D printed solution reservoir 3 loaded with the pre-strand composition, a micro-needle 5 having a tip 6 to pull the strand from the pre-strand composition, and a translation stage 8 on which the micro-needle 5 is mounted using 3D printed mounts 9. The solution reservoir is mounted on a stand 2 and the translation stage 8 is mounted so that the tip 6 of the micro-needle 5 translates along a horizontal vector to be inserted into the pre-strand composition in the solution reservoir 3, and then to be withdrawn from the solution reservoir 3 to pull out the polymer strand from the pre-strand composition along the same horizontal vector in a reverse direction. Movement of the translation stage 8 is controlled by a variable speed motor (not shown). At least the tip 6 of the micro-needle 5 is preferably made of stainless steel.

Figure 2A:
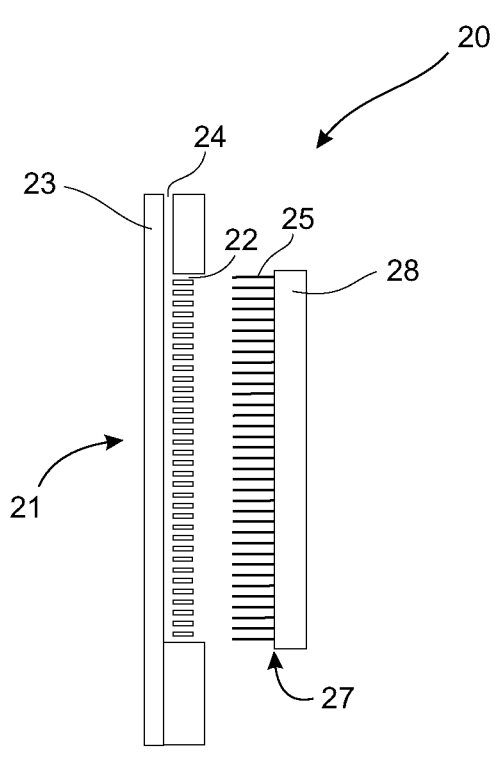
FIG. 2A depicts a schematic diagram of a side cross-sectional view of an apparatus for producing a plurality of polymer strands simultaneously.
Figure 2B:
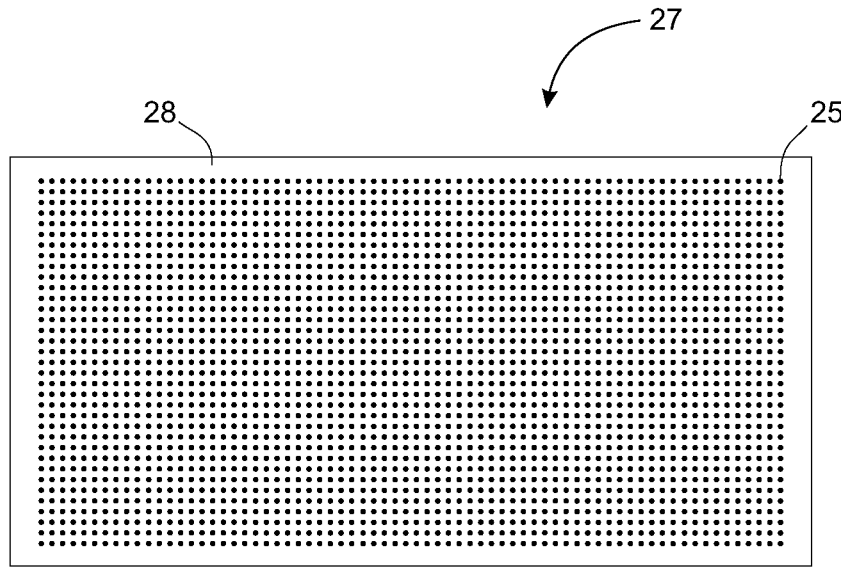
FIG. 2B depicts a front view of a pin brush containing multiple nucleation elements of the apparatus of FIG. 2A.

In another embodiment as shown in FIG. 2A and FIG. 2B, an apparatus 20 for producing a plurality of polymer strands simultaneously from a pre-strand composition comprises a 3D printed solution support 21 for containing the pre-strand composition and a pin brush 27 comprising a 70×35 array of pins 25 (only one labeled) protruding from a front face of a brush plate 28. The solution support 21 comprises a support plate 23 having a gap 24 between front and rear faces of the support plate 23 for containing the pre-strand composition and a 70×35 array of apertures 22 (only one labeled) in the front face of the support plate 23 that can be aligned with the array of pins 25. With the pins 25 and the apertures 22 aligned, the pins 25 can be inserted through the apertures 22 into the pre-strand composition in the gap 24, and then withdrawn to pull polymer strands from the pre-strand composition. While the apparatus 20 is illustrated as a hand-held device, the solution support 21 can be mounted on a stand and the brush plate 28 mounted to a translation stage to be operated in a manner similar to the apparatus of FIG. 1. The apparatus 20 has a high density of strand nucleation sites for high-throughput strand formation. Instead of the support plate comprising a gap therein for containing the pre-strand composition and apertures to access the gap, the support plate can comprise a flat surface capable of holding the pre-strand composition in a shallow pool. Such an arrangement eliminates the need for aligning the pins with apertures.

After producing polymer strands, the strands can be transferred to a collector such as a spool or a circular frame, where the strands can be subsequently assembled into threads, yarns, weaves, knits, felts and the like. The entire manufacturing process can either be done by hand, or to improve production efficiency and better control strand size, the process can be automated using simple robotic systems.

EXAMPLES

Example 1: Process Optimization for Polymer Strand Production

Materials and Methods:

The following dextran molecular weights (M$_w$) were examined: 70, 150, 250, and 500 kDa. The 70, 150 and 500 kDa dextrans were purchased from Dextran Products Limited, while the 250 kDa dextran was purchased from Pharmacosmos™. For each M$_w$, various solutions were made with concentrations of dextran ranging from 40 wt % (wt/wt) to 63 wt % (wt/wt). Deionized (DI) water was the solvent used for the analysis of the strand pulling process. DI water and type I collagen in 0.02 N acetic acid (Rat tail Collagen I from Corning) were used as solvents for the strand diameter analysis. For each M$_w$ dextran, a homogenous polymer solution with the desired concentration was obtained by adding dry polymer to the appropriate mass of solvent in a plastic weighing dish and manually stirring using a pipette tip until the polymer completely dissolved. The resulting solution was then transferred to a 1 mL syringe to prevent evaporative solvent loss during storage and to control the volume of solution added to the contact drawing apparatus.

Viscosity Measurements

Figure 3:
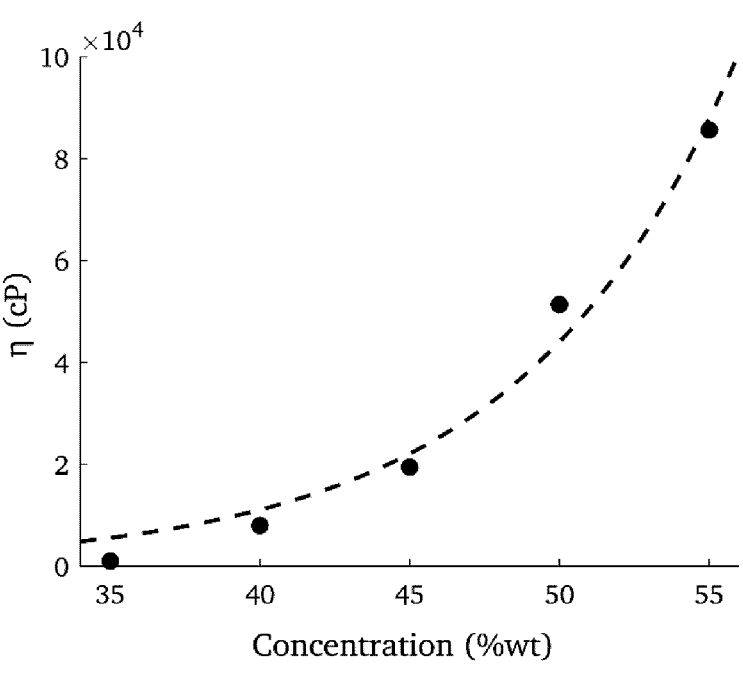
FIG. 3 depicts a graph of bulk viscosity $\eta$ (cP$\times 10^4$) of 500 kDa dextran and water solutions as a function of concentration. For the various wt % used in the contact drawing experiments, the bulk viscosity values were extrapolated from an exponential fit (broken line).

All experiments were conducted at 22.5-24.0° C. and relative humidity less than 20%. Dextran solution viscosity (η) was measured using the falling ball method. A spherical stainless-steel ball bearing with a diameter of 0.399±0.002 cm and mass of 0.2611±0.0001 g was dropped into the solution inside a polystyrene conical tube. Solutions of 500 kDa dextran in water were prepared at 35, 40, 45, 50, and 55 wt % and centrifuged at 3000 rcf for 15 minutes to clear any suspended air bubbles. A digital timer accurate to 0.001 s and a ruler accurate to 0.5 mm were used to measure the distance travelled by the falling ball over time, from which a velocity was calculated. An Anton Parr DMA 35 handheld density meter accurate to 0.001 g/cm$^3$ was used to measure the density of each solution. Viscosity was calculated according to:

$$\eta = \frac{2(\Delta P)gr^2}{9\nu}$$

where $\Delta P$ is the difference in density between the solution and the ball bearing, g is the acceleration due to gravity, r is the radius of the ball bearing, and v is the velocity of the ball bearing traveling through the dextran solution. For any concentration of 500 kDa dextran not directly tested, the viscosity was interpolated from the plot of concentration versus viscosity shown in FIG. 3.

Contact Drawing Apparatus

An apparatus as shown in FIG. 1 was fabricated for producing strands of a polymer. The apparatus comprised a steel micro-needle with a shank diameter of 0.5 mm purchased from Ted Pella™ (product #13601C) to pull the strands. The micro-needle was mounted onto a 100 mm linear translation stage (Thorlabs™ DDSM100/M) using 3D printed fittings. With this mounting set-up, the translation stage was able to reach velocities up to 400 mm/s. The translation stage was operated using Kinesis software from Thorlabs, which sets the movement speed and stop position. Using an Edgertronic™ high speed camera fitted with a Nikon™ Nikkor™ 50 mm lens, the stage speed was calibrated by recording videos of set speeds in 60 mm/s intervals. A solution reservoir was 3D printed to hold the solution from which the micro-needle would pull a strand. The solution reservoir was designed to hold 50 μL in a 2×5×5 mm rectangular reservoir with an open top and front face to allow filling with a syringe. The micro-needle was able to reach a depth of approximately 4 mm inside the reservoir at the positional limit of the translational stage.

For analysis of the strand pulling process, the 3D printed solution reservoir was filled with 50 μL of dextran solution. The dextran solution was replaced every 10 minutes to mitigate the effects of evaporation and to ensure that the micro-needle entered at a consistent depth with respect to the surface of the dextran solution. The stage was programmed such that the micro-needle entered the filled solution reservoir at a speed of 29 mm/s to a depth of approximately 4 mm, stopped for 0.5 s, and then retracted at a set speed to obtain the desired pull duration ($\tau_{pull}$) calculated as:

$$\tau_{pill} = \frac{\text{path length}}{\text{pull speed}}.$$

A trial was assigned a success if a strand was obtained for the set path length, otherwise, a failure was recorded, and the failure mode noted. Two failure modes were observed. Mode I was a relaxation failure occurring when the strand was released from one or both ends before the pull was complete. Mode II was a stranded droplet failure, where a liquid droplet was trapped along the strand and caused the strand to droop. At least 15 trials were conducted for each $\tau_{pull}$, and the failure rate was calculated according to:

$$\text{failure rate} = \frac{\text{\# of failed trials}}{\text{\# of total trails}} \times 100\%.$$

Starting with a $\tau_{pull}$ that resulted in a 0% failure rate, the $\tau_{pull}$ was increased by decreasing the translation speed of the stage until the failure rate reached 100%. The micro-needle was wiped clean between trials using a Kimwipe™ soaked in ethanol. High-speed videos of some of the trials were recorded using the Edgertronic™ camera for qualitative analysis of the pulling process.

The data for failure rate as a function of $\tau_{pull}$ were fit with a Weibull cumulative distribution function, which is a statistical model widely used for failure analysis over time. Using the Matlab™ Curve Fitting Tool, the data were fit according to:

$$\text{failure rate} = 1 - \exp\left(-\left(\frac{\tau_{pull}}{a}\right)^k\right)$$

where a is the scale parameter representing the inflection point of the cumulative distribution and k is the shape parameter representing the width of the distribution. Data sets were only fit if they contained at least 3 points that were not 0% or 100% failure rate.

Strand Diameter Measurements

To characterize the strand diameter, at least 5 strands were collected at a given pull duration on a 25.4×76.2×1 mm glass slide (Ultident™ 170-7107A), which was then capped with a 24×50×0.15 mm glass coverslip (Deckglaser™ 470819) using double sided tape. For all concentrations and $M_w$ of dextran, pull durations were set to 0.25 s, unless otherwise noted. To measure the diameter, the strands were imaged on a Nikon Eclipse™ Ti optical microscope using a 40× objective. Each strand was imaged at 3 points, approximately 1 cm apart along the strand length. Once imported to ImageJ™, the images were converted to binary, and processed using the ImageJ™ smooth function which simplified edge finding by averaging the pixels in a 3×3 matrix. The diameter of the strand was then measured between the two outer edges using a rectangular region of interest with a width of 200 pixels. This allowed each diameter measurement to be an average over a 17 μm length of strand and reduced measurement error by ensuring that the measured diameter was perpendicular to the strand length.

Figure 4:
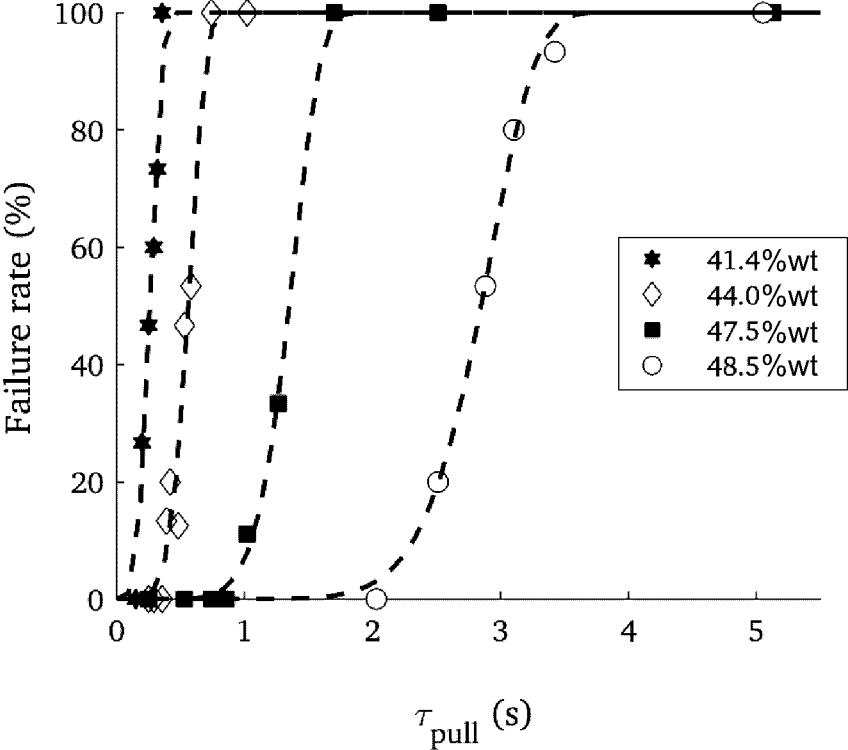
FIG. 4 depicts a graph of failure rate as a function of $\tau_{pull}$, for four different concentrations of 500 kDa dextran in water. Each data set is fit using a Weibull cumulative distribution function, all with resulting $r^2 > 0.9$. Every concentration shows a sharp transition from 0% to 100% failure rate over a narrow range of $\tau_{pull}$. The error on $\tau_{pull}$ is less than 1%, and the failure rate is taken as the percentage of failures from at least 15 trials.

Results and Discussion:

Dextran was used as a model polymer, and the results obtained using dextran can be applied broadly to other polymers. To understand the contact drawing process and identify important parameters controlling strand formation, $\tau_{pull}$ was varied and the strand formation process was observed using a high-speed camera at various time points during a successful pull. For a short $\tau_{pull}$ (one that resulted in a 0% failure rate), the strand remains connected to both the micro-needle and the solution reservoir until the pull is complete, exemplifying a successful trial. As $\tau_{pull}$ increases, the rate of mode I failures increases where an incomplete strand is released from at least one contact point before the pull is complete. Mode I failure occurs more frequently and is more predictable (as explained below) than mode II failure. In mode II failure, a liquid droplet becomes trapped along the strand and causes the strand to droop. Mode II failures accounted for less than 2% of all failures. Failure rate as a function of $\tau_{pull}$ for four different concentrations of 500 kDa dextran in water is presented in FIG. 4. For each concentration, the failure rate sharply transitions from 0% to 100% over a very narrow range of $\tau_{pull}$ values. This sharp transition in the cumulative distribution of failures is indicative of a characteristic time scale for the contact drawing process.

It is known that dextran molecules form random coils in water, meaning water is a theta-solvent for dextran. Dextrans of 70 and 500 kDa have overlap concentrations (c*) of 10.6 and 5.1 g/dL or approximately 9.6 and 4.8 wt %, respectively. For a given solution, the entanglement concentration ($c_e$) is much greater than c*. As an example, for polystyrene (a neutral polymer) in toluene, $c_e \approx 10c^*$. Here, concentrations of approximately 6 and 10 times greater than $c^*$ were used for 70 and 500 kDa dextran, respectively, such that all the dextran solutions were in the entangled regime. Within an entangled solution, the reptation time ($\tau_{rep}$) is the characteristic time necessary for polymers to escape entanglements and flow freely. Therefore, if the interaction time with an entangled solution is greater than $\tau_{rep}$, entanglements are abandoned and a viscous response is observed, whereas at timescales shorter than $\tau_{rep}$, entanglements act as temporary crosslinks and a viscoelastic response occurs. Since the concentrations of all dextrans are well above the overlap concentration $c^*$, the sharp transitions from 0 to 100% failure rate in FIG. 4 suggest entanglements are the main mechanism for strand formation. By fitting the curves in FIG. 4 and extracting the inflection points (which represent the timescale), it is thus possible to extract $\tau_{rep}$ for a given solution.

To further explore the role of strand entanglement in the strand formation process, failure rate curves were fit with a Weibull cumulative distribution function, which is a statistical model widely used for analyzing systems with a failure rate proportional to time. For the 24 data sets, 19 fits have an $r^2 > 0.90$. The lowest $r^2$ value calculated is 0.76. Each fit has a shape parameter $k > 1$, which represents an increasing failure rate over time, as would be expected from a system where an increase in pull duration results in an increase in the probability of a viscous response. In theory, the transition from a viscoelastic response to a viscous response should be immediate because a solution with a known concentration and well-defined $M_w$ should have a single well-defined $\tau_{rep}$. However, the polymers used here are polydisperse (PDI=9.1 for 500 kDa dextran) and the solutions may have local heterogeneities in concentration. Both factors lead to a distribution of $\tau_{rep}$, which is captured by the $k$ parameter.

Figure 5A:
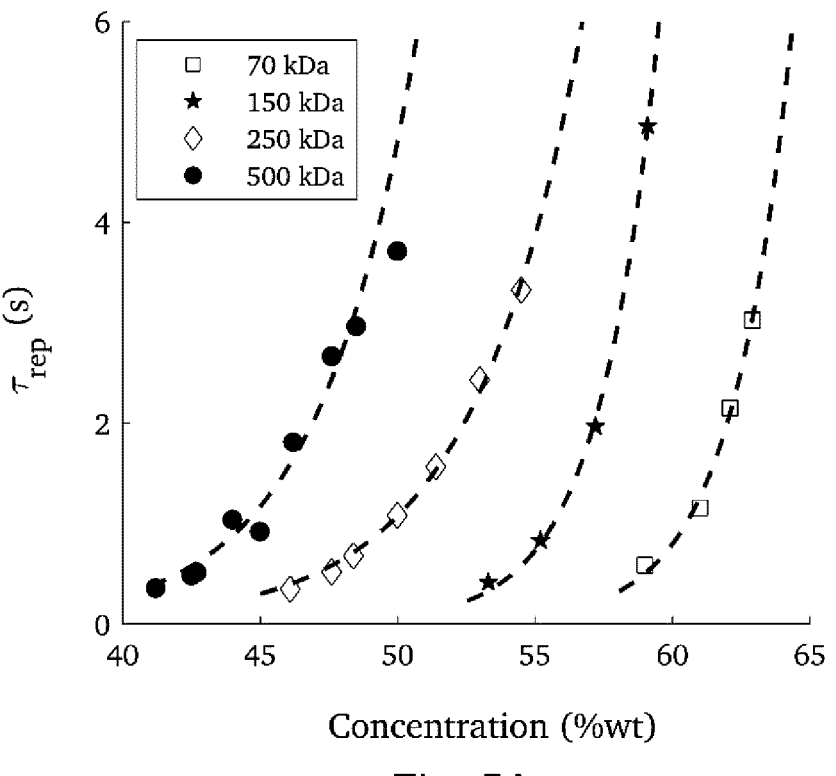
FIG. 5A depicts a graph showing the experimentally determined $\tau_{rep}$ (FIG. 4) as a function of concentration for four different dextrans of increasing molecular mass. Each data set is fit with an exponential function (all $r^2 > 0.9$).

From each fit, the scale parameter $a$ is the experimentally determined $\tau_{rep}$ for the specific solution. FIG. 5A plots these data for $\tau_{rep}$ as a function of concentration for various $M_w$ values. For a given $M_w$, $\tau_{rep}$ scales exponentially with concentration. Physically, the increase in $\tau_{rep}$ can be understood as an increase in the number density of entanglements resulting from an increase in concentration. As the entanglement density increases, the time necessary for a polymer to abandon entanglements and flow freely increases. FIG. 5A also shows an increase in $\tau_{rep}$ with increasing $M_w$ at a fixed concentration. This is most clearly observed for the 250 and 500 kDa dextrans. For a fixed concentration, doubling the $M_w$ is equivalent to bonding two polymer chains together end to end while leaving the entanglement density the same. Thus, the increase in $\tau_{rep}$ does not come from an increased entanglement density, but rather results from each polymer having to escape twice as many entanglements.

Figure 5B:
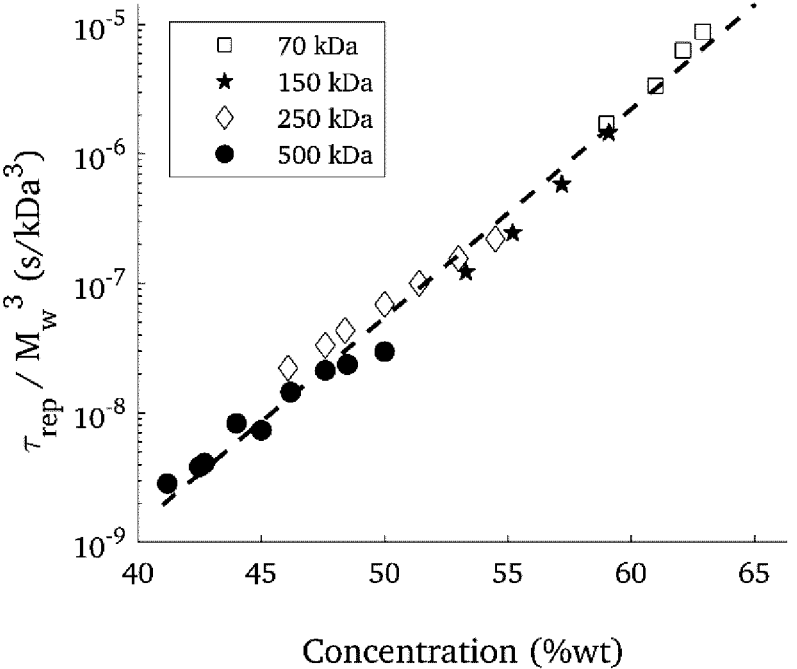
FIG. 5B is a graph showing a semi-log plot of the data from FIG. 5A rescaled as $\tau_{rep}$ times $M_w^{-3}$, collapsing it onto a single exponential trend ($r^2 = 0.998$). Error bars cannot be seen, but the greatest average error for $\tau_{rep}$ is 0.4 s at 500 kDa, and the error on concentration is less than 1 wt %.

The reptation model for an entangled solution predicts that $\tau_{rep}$ scales as $M_w^3$. Rescaling $\tau_{rep}$ according to this model allows the data to be collapsed on a single exponential trend (FIG. 5B). This indicates that all the dextran solutions analyzed in this study have concentrations greater than $c_e$ and supports the assertion that polymer entanglement is the main mechanism for strand formation.

Although the data are well fit ($r^2 = 0.998$) with an exponential function, the reptation model predicts $\tau_{rep}/M_w^3$ to scale as a power law in concentration. However, this model is based on monodisperse linear polymers, whereas the dextran used in these experiments has some degree of polydispersity and is known to branch at high molecular weights. Both of these experimental conditions would complicate interpretation of the entanglement model considerably, as the polydispersity is known to increase relaxation times of polymer networks by a factor of 3 or more, and the presence of branching can suppress reptation and increase relaxation time proportionally with branch length. Despite this discrepancy, the experimentally determined $\tau_{rep}/M_w^3$ data collapse to a universal trend. This validates polymer entanglement as the mechanism for strand formation and allows prediction of the manufacturing conditions necessary to create strands over a wide range of molecular weights and solution concentration.

In contact drawing, pulling at timescales shorter than $\tau_{rep}$ produces solid strands that can be collected and stored for months without any applied strain. These strands do not relax or flow viscously over these extended time periods indicating that water has evaporated from the pulled strands. Since the strand diameters are on the order of microns while being at least several centimeters in length, water evaporation occurs rapidly due to the large surface area to volume ratios. By analyzing the effects of contact drawing conditions and initial solution properties on final strand diameters, one can gain further insight into the strand manufacturing process.

Figure 6A:
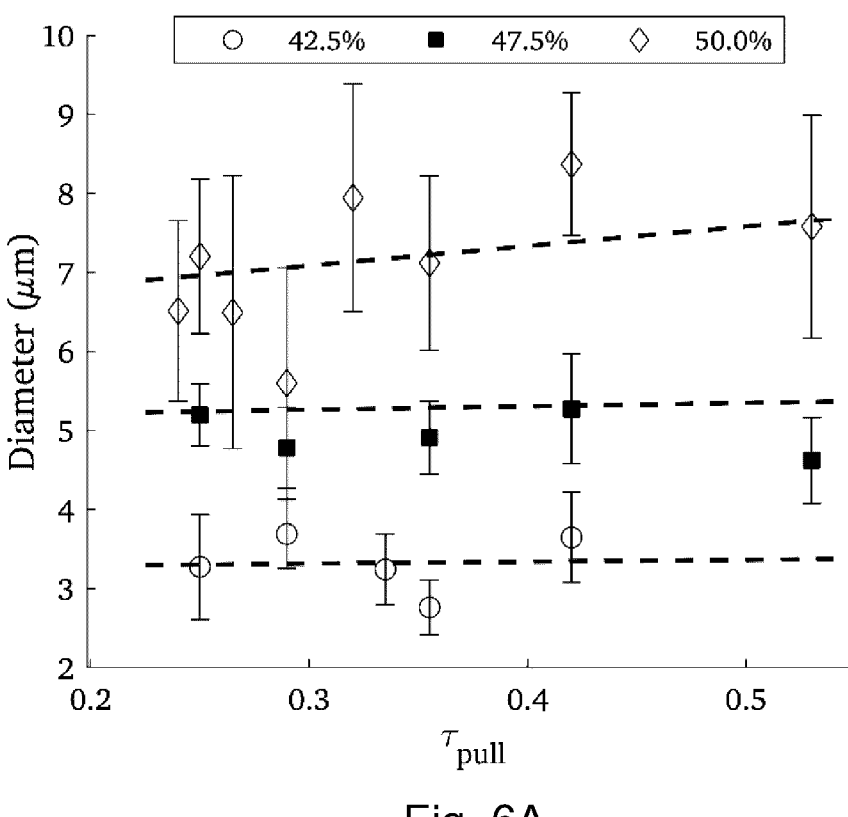
FIG. 6A is a graph of strand diameter as a function of the pull duration for various concentrations of 500 kDa dextran in water.
Figure 6B:
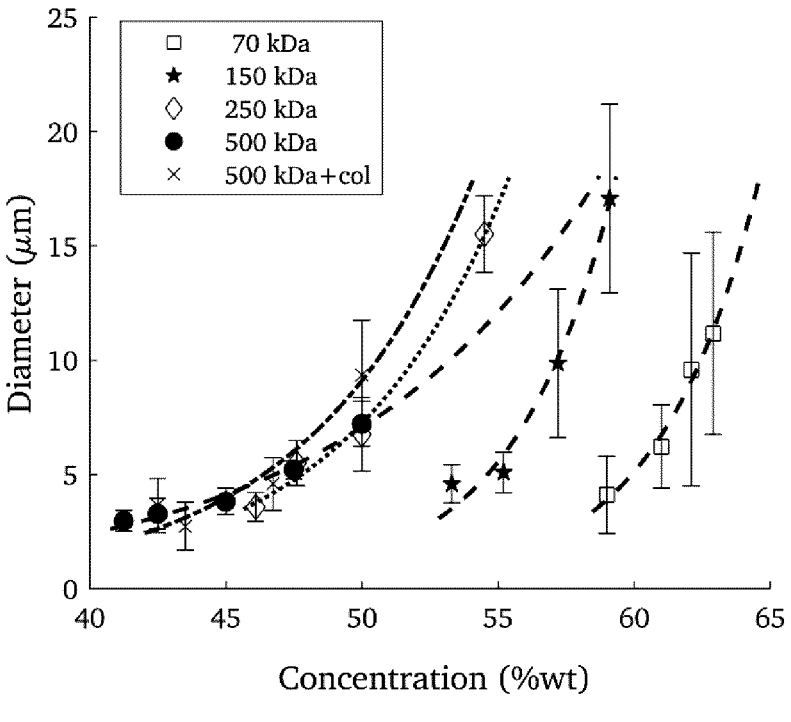
FIG. 6B is a graph of strand diameter as a function of concentration for various $M_w$ dextrans. All of the strands represented in FIG. 6B were pulled at 40 cm/s, 0.25 s pull duration. Each data point is the mean of 3 measurements on 5 strands pulled under identical conditions. The error bars represent the standard deviation of the mean.

FIG. 6A presents the dry strand diameter as a function of $\tau_{pull}$ for various concentrations of 500 kDa dextran in water. For a given concentration, the strand diameter is independent of $\tau_{pull}$ within the experimental error. According to these data, if $\tau_{pull}$ is shorter than $\tau_{rep}$, the final strand diameter is independent of how fast the strand is pulled. However, strand diameter increases with increasing concentration. This trend is shown across all $M_w$ values as seen in FIG. 6B. For a given $M_w$, the strand diameter is seen to increase exponentially with concentration. For a given concentration, strand diameter generally increases with M. This trend is observed for dextrans of 70 to 250 kDa, but not between the 250 and 500 kDa dextrans. The open circles in FIG. 6B show the diameters of strands from 500 kDa dextran dissolved in a 8.70 mg/ml collagen solution in acid. These data overlap the 500 kDa in water data very well, indicating that the integration of a small amount of biological material into the dextran solution does not impact strand formation. Therefore, the formation of collagen/dextran strands and other polymer strands can be predicted using the trend in FIG. 6B.

The trend of increasing strand diameter with increasing concentration can be understood qualitatively through analyzing the contact drawing process. Once a strand is pulled and the micro-needle stops moving, there is a secondary flow of the liquid bridges attaching the strand at its ends. Numerous previous studies on liquid bridges in entangled solutions have characterized a recoverable elastic strain stored within the viscoelastic solutions. With no applied strain, this stored elastic energy is responsible for generating the secondary flow. For 45 wt % and 50 wt % solutions of 500 kDa dextran and water, the secondary flow begins with a liquid bridge of a diameter approximately 200 times larger than the final strand. Over time, liquid flows back into the solution reservoir shortening the liquid bridge, until all the liquid returns to the solution reservoir and the final strand is released. The relatively large variance in diameter measurements may result from the variance in time elapsed between pulling a strand and collecting the strand. Since the strands were collected manually, a strand collected before all the liquid flowed to the end would appear larger than a strand collected at a later point. This effect is likely the main source of experimental error in FIG. 6A.

Interestingly, this secondary flow occurs noticeably faster in the 45 wt % solution than the 50 wt % solution, with both pulls occurring over the same duration. The 45 wt % solution with a bulk viscosity of about 8000 cP has an average flow speed of 3.1 mm/s, whereas the 50 wt % solution with a bulk viscosity of about 85,000 cP has an average flow speed of 1.1 mm/s (See FIG. 3 for the bulk viscosity values). Thus, the increasing strand diameter with increasing concentration can be understood qualitatively by analyzing the tip of this necking region. At this tip, the highly concentrated solid strand meets the liquid bridge, and this intersection retracts at a constant flow speed over time. Assuming a constant evaporation rate as well, the larger the flow speed the more polymer will flow with the liquid and return to the solution reservoir, resulting in a smaller strand. It follows that the lower the flow speed, a greater weight fraction of polymer remains in the strand as the solution dries out, resulting in a larger final strand. In other words, the bulk viscosity controls the speed of the secondary flow that in turn controls strand diameter.

Further, according to the reptation model, $\tau_{rep}$ and viscosity are directly related through:

$$\tau_{rep} \sim \frac{\eta}{\% \ wt^{7/3}}.$$

Figure 7A:
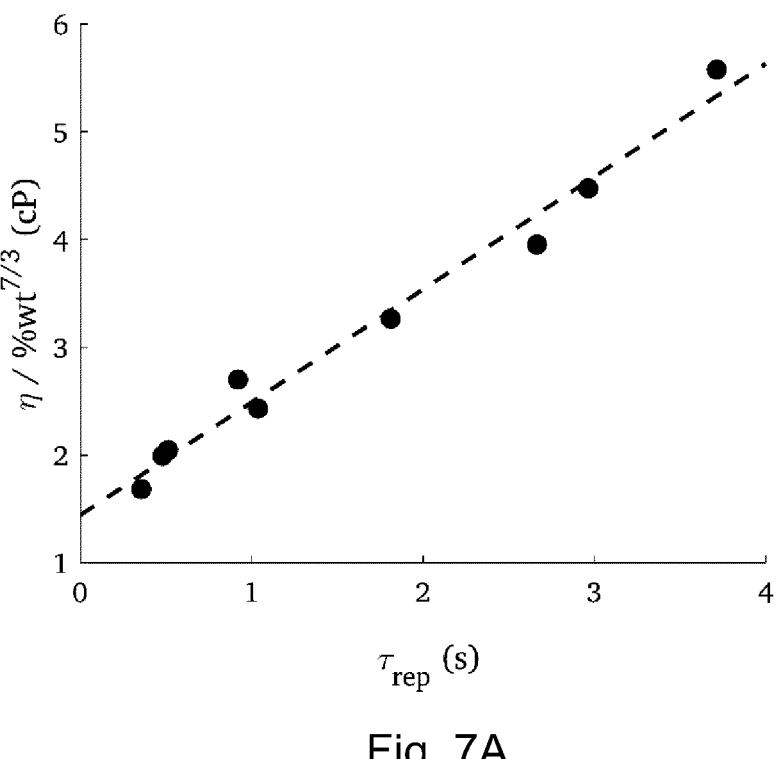
FIG. 7A depicts a graph showing $\eta/\% \ \mathrm{wt}^{7/3}$ for 500 kDa dextran.

FIG. 7A presents $\eta/wt \ \%^{7/3}$ as a function of experimentally determined $\tau_{rep}$ for 500 kDa dextran in water fit with a linear trend ($r^2 > 0.9$) as predicted by the reptation model. Again, these data are in accordance with reptation model predictions, and show the validity of using $\tau_{rep}$ as a scaling factor for $\eta$.

Figure 7B:
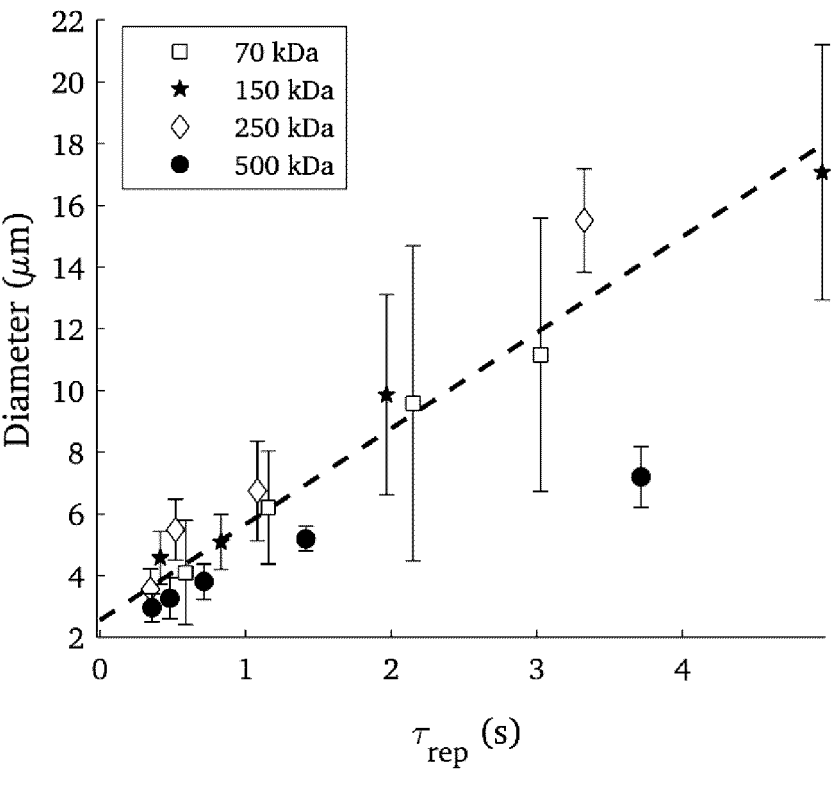
FIG. 7B depicts a graph showing strand diameter across various $M_w$ as a function of pull duration ($\tau_{pull}$). The viscosity data in FIG. 7A is interpolated from FIG. 3, and the linear fit has an $r^2 > 0.9$. The data points in FIG. 7B are the same as in FIG. 6B and the linear fit has an $r^2 = 0.9$.

With the understanding that $\tau_{rep}$ can be used a proxy for viscosity, FIG. 7B shows a plot of strand diameter as a function of $\tau_{rep}$ for all $M_w$ of dextran. Diameter scales linearly with $\tau_{rep}$ ($r^2=0.90$), which means the final strand diameter scales linearly with n across all $M_w$ values. Thus, the scaling of strand diameter with concentration seen in FIG. 6B can also be explained by the increased concentration resulting in an increased viscosity. This demonstrates that the final strand diameter is largely determined by the solution concentration and viscosity.

Analysis of 10 cm long, stable liquid bridges formed from a highly viscous dextran solution using the present process identified important parameters controlling the contact drawing process. Failure analysis demonstrated that producing a stable bridge is dependent upon the relaxation time of entanglements within the polymer solution. If the strand is pulled at times shorter than this critical timescale, the liquid bridges will stabilize into polymer strands of the desired length. Although the pull speed has no apparent effect on strand diameter, the viscosity of the initial solution does. As the viscosity increases, the flow speed decreases during the secondary flow leading to larger final strand diameters. The dependence of strand diameter on solution properties persists with the addition of type I collagen, which is important in the use of these strands as a biomaterial.

Example 2: Production of Poly(Ethylene Oxide) Strands

Materials and Methods:

Polyethylene oxide (PEO) (1 MDa, lot #MKCM5188 and MKCF6841 was obtained from Sigma Aldrich. Hydrochloric acid (HCl) was purchased from ACP chemicals and diluted to 10 mM with reverse osmosis water.

A 15-gram solution of 10 mM HCl was weighed on a CL Series OHAUS scale in a 50 mL VWR falcon tube. Desired amounts of the PEO were measured gravimetrically on a VWR analytical balance. The PEO powder was gradually added to the 10 mM HCl solvent and the solution mixed using a glass stirring rod for 5 minutes. The solution was then left under ambient temperature for 3-5 days to homogenize to form the pre-strand composition of PEO. The pre-strand composition was degassed using an Eppendorf™ Centrifuge 5702 RH.

PEO strands were pulled from the pre-strand composition using pull rates in a range between 0.5-4 m/s. Optimally, 1-2 m/s is a range in which the spin cones were most stable. As the pull rate increased, the length of the multifilament strand gradually increased then decreased. As the pull rate increased above the optimal range, the spin cone elongated and became less stable, resulting in decreased strand length. The ambient conditions of the room were recorded with a TP49 Thermo Pro™ Hygrometer. The ambient relative humidity was in a range of 25-27% and the temperature was in a range of 27-29° C.

Results and Discussion:

PEO is linear unbranched homopolymer of ethylene oxide. The rheology of pre-strand compositions comprising PEO is important to understand in detail if PEO is to be used to produce long and strong strands, especially with a view to using PEO as a scaffold polymer for the formation of strands of other polymeric entities, e.g., collagen.

In various industrial fields, water soluble polymers are commonly used as thickening agents to control the viscosity of aqueous solutions. Controlling the viscosity of a polymer solution requires understanding the complex relationship between chemical formulation, polymer molecular weight and polymer concentration. Understanding the flow properties of PEO solutions as they apply to making continuous strands, especially when PEO is used as a scaffold polymer for nano-scaled multifilament strands is important.

Pre-strand composition properties should permit the formation of and promote the stability of spin cones containing strands of the polymer. Spin cones should be kept stable for as long as possible. When hand pulling or machine pulling short lengths of strands (<1 m), spin cone instability is not an issue because strands are pulled for <4 seconds, resulting in either obtaining a strand or not obtaining a strand. When pulling long strands, especially long multifilament strands managing spin cone stability for minutes not seconds is necessary.

Figure 8A:
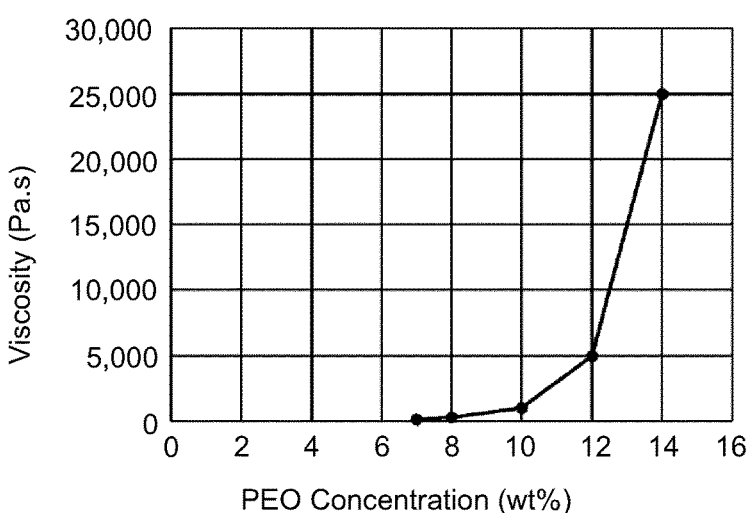
FIG. 8A depicts a graph of polyethylene oxide (PEO) concentration (wt %) vs. viscosity (Pa·s) in a pre-strand composition of 1 MDa PEO in 10 mM aqueous HCl solvent showing a logarithmic increase in viscosity as the concentration of the PEO increases.
Figure 8B:
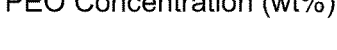
FIG. 8B depicts a graph of pre-strand composition viscosity (Pa·s) vs. average length (m) for strands of PEO pulled from the pre-strand composition of FIG. 8A showing the ability to pull PEO strands to lengths above 15 m.
Figure 8B:
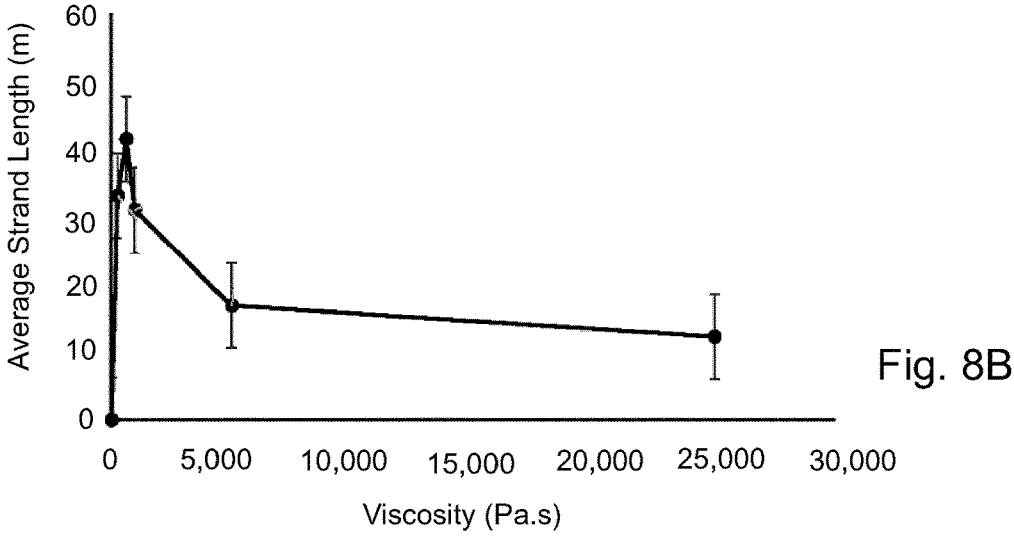

It has now been found that control over the viscosity of the pre-strand composition leads to improvement in spin cone stability. When the pre-strand viscosity is too low, unstable spin cones are produced, which quickly collapse (<5 sec) resulting in no or short strands being formed. If the pre-strand composition viscosity is too high, shorter fibers are produced. FIG. 8A (from Ebagninin K, et al. *Journal of Colloid and Interface Science* 336 (2009) 360-367) shows that pre-strand viscosity composition is logarithmically related to polymer concentration, so adjusting viscosity benefits from precision. Long PEO strands typically >40 meters can only be formed when the pre-strand composition viscosity produces spin cones that are stable enough to persist, yet not so viscous as to preclude recruitment of new PEO molecules into the spin cone and pulled into the nascent strand. From FIG. 8B, it is evident that a range of pre-strand composition viscosity between 300 and 5,000 Pa·s, preferably 300-1,000 Pa·s, for example 650 Pa·s, is optimal. In FIG. 8B, each point represents an average of at least 7 replicates. Average strand lengths from viscosities of 300, 650 and 1000 Pa·s are significantly higher (P<0.05) than strands formed from pre-strand compositions having viscosities of 5,000 Pa·s and greater. Pre-strand compositions with viscosity of 150 Pa·s or less do not support strand formation because of spin cone instability. Pre-strand composition viscosities above 5,000 Pa·s produce shorter PEO-based strand lengths.

Figure 8C:
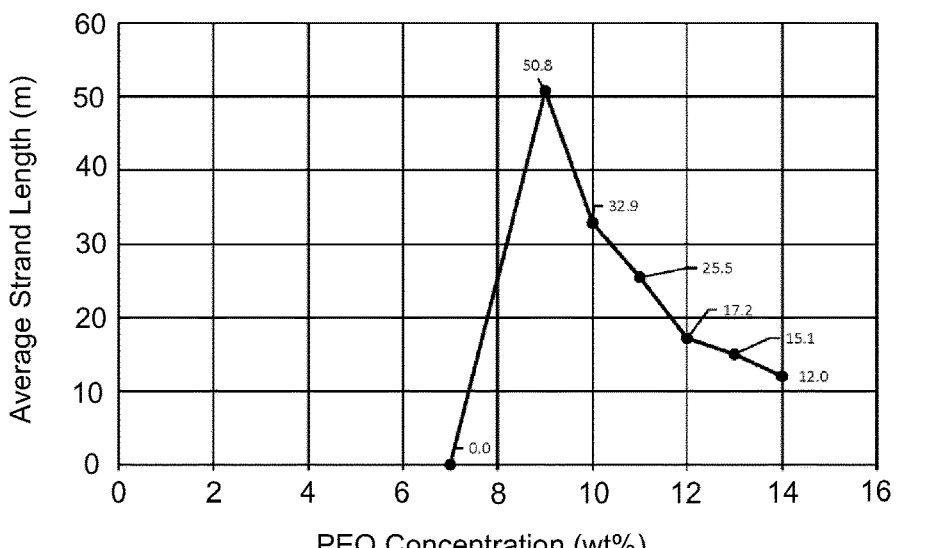
FIG. 8C depicts a graph of PEO concentration (wt %) in the pre-strand composition vs. average length (m).

For 1 MDa PEO, $c^*$ is 1.5 wt % based on total weight of the pre-strand composition and $c_e$ is 5 wt % based on total weight of the pre-strand composition (Ebagninin 2009). As evidenced by FIG. 8C, no strands are formed at these concentrations of PEO. Strands form when the concentration of PEO is about 7 wt % or greater based on total weight of the pre-strand composition. Further, long strands are only formed when the concentration of PEO in the pre-strand composition is in a relatively narrow range of 7-14 wt %, preferably 7-10 wt %. At these concentrations, which are above $c_e$, the pulling of the strands therefore involves a viscoelastic response.

Example 3: Production of Collagen Strands with 8 MDa Poly(Ethylene Oxide) Scaffold Polymer Materials and Methods:

A 0.1 wt % aqueous stock solution of 8 MDa poly (ethylene oxide) (PEO) (Sigma-Aldrich) and nano-pure water was prepared from PEO powder and allowed to equilibrate for 48 hours. The PEO aqueous solution was combined with collagen stock solution of 9.29 mg/ml rat tail collagen in 20 mM acetic acid (Corning). The two solutions were combined so that the dry mass fraction of collagen and PEO represented the desired collagen percentage for the final strand. The PEO-collagen solutions were placed on a shaker table at 4° C. for 48 hours to dissolve and form a homogeneous solution. Solutions for forming pure PEO strands were made following the same protocol of the 0.1 wt % PEO stock solution but with a PEO mass fraction of 1%.

Figure 9:
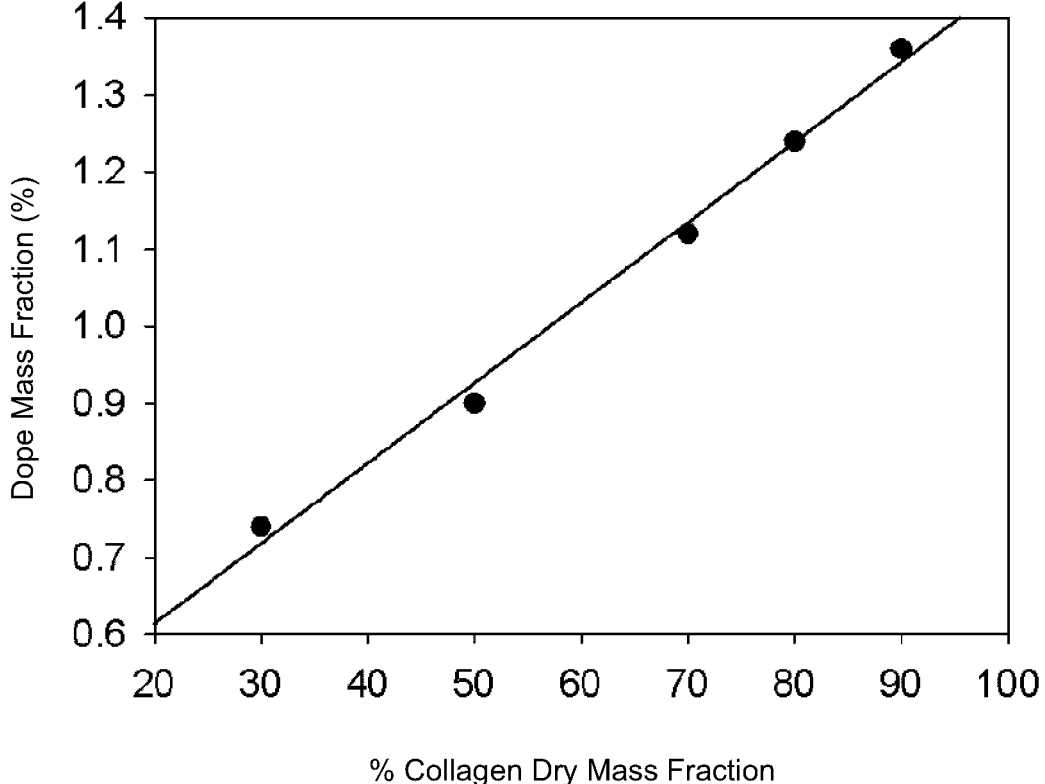
FIG. 9 depicts a graph of hydrated % mass fraction of collagen and PEO in solution as a function of % dry mass fraction of collagen in the solution at the point of successful strand formation during a dehydration process. The linear relationship between increasing collagen content and hydrated mass fraction of collagen and PEO enables reproducible production of PEO-collagen strands of the desired collagen composition.

Prepared polymer-collagen solutions were poured onto a smooth plastic surface. Water was removed via evaporation in ambient conditions (25° C., 30% humidity) until the concentration of PEO and collagen in the solution was high enough to form strands. Strand formation was tested every 10 minutes by touching a pipette tip to the surface and pulling the pipette away. This was repeated until a usable strand would form, which is one which would be dry upon formation and retain its shape once formed, at which point the final mass of the solution was measured and the combined mass fraction of PEO and collagen recorded (FIG. 9).

Contact Drawing

Strands were formed by pressing together and pulling apart two substrates. One substrate was a plastic surface covered in the prepared PEO-collagen solution and the other, a customized 3D printed pin brush as described in connection with FIG. 2B. Contact drawing resulted in the formation of dry PEO-collagen strands. Each pin of the pin brush functions as a point for strand nucleation, allowing for control in strand spacing and number of strands formed. The process can be repeated multiple times without tending to the PEO-collagen solution or either substrate. Strands were collected on glass microscope slides, glass cover slips, and SEM stubs for characterization. All strands were directionally aligned.

Strand Characterization

Strands prepared from solutions with a dry mass fraction of collagen at 0%, 30%, 50%, 70% 80% and 90% were characterized with a focus on strand structure, collagen content and collagen organization before and after hydration. Strands from solutions with 95% mass fraction were also formed but were not fully analyzed.

Scanning Electron Microscopy.

Scanning electron microscopy (SEM) was performed on all strand compositions after initial strand formation, and after a rehydration and subsequent drying process. First, strands were pulled over and collected on SEM stubs. At this point multiple SEM stubs were set aside for dry strand analysis while others were hydrated in PBS for 1 hour at room temperature, rinsed 3× with nano-pure water and dried under lab air flow. The samples were then sputter coated with gold/palladium to a thickness of 3.18 nm and imaged with a JEOL 840 SEM (JEOL Ltd.) operating within the range of 2-5 kV and using magnifications up to 145,000×. Strand diameter (n=25) and architecture from the resulting images were analyzed using the line tool in ImageJ™

Raman Spectroscopy

Raman spectroscopy was performed on dry PEO-collagen strands, as well as rehydrated and rinsed 90% PEO-collagen strands (n=5). The Raman system included an inverted microscope (1X71; Olympus, Center Valley, PA), a IHR550 Raman spectrometer (Horiba Jobin Yvon, Edison, NJ) and a 532 nm solid state laser for sample excitation. All spectra were acquired using a 1.3 NA 100× oil-immersion objective lens, a 1 μm laser spot, a pinhole size of 200 μm and a laser power of 3 mW. Glass cover slips with attached strands were placed on the inverted microscope with strand orientation parallel to laser polarization. Spectra for each strand comprised ten 10-second acquisitions, with a spectral range from 800 cm$^{-1}$ to 1800 cm$^{-1}$. Individual spectra were corrected via background subtraction and linear baseline procedure prior to spectral group summing by strand collagen percent. Summed spectra were then smoothed using a 25 wave number moving average filter and set to baseline again prior to analysis. Each collagen % spectrum was integrated between 1100 cm$^{-1}$ and 1150 cm$^{-1}$, C—O stretching and $CH_2$ rocking vibrations specific to PEO, and 1550-1740 cm$^{-1}$ (the amide I peak specific to collagen). These integrals where then normalized by their respective wave number range, and then summed. The percent contribution to this sum associated with the collagen specific amide peak was then calculated from each group.

Collagen Immunofluorescence

PEO-collagen strands were collected on glass microscope slides and rinsed for 2 hours in PBS. The PBS was then removed and replaced with a solution of 5% bovine serum albumin (BSA) (Sigma Aldrich) in PBS for 20 minutes. After 20 minutes the solution was replaced with fresh 5% BSA PBS and left for 16 hours on a shaker table. A solution of 1% wt/wt BSA PBS was prepared and left for 16 hours on a shaker table at 4° C. Following the 16 hours in the 5% BSA PBS bath, the samples were rinsed three times for 15 minutes each time in PBS and placed in a bath of the previously prepared 1% BSA PBS with a ratio of 1:10000 mouse-anti-collagen|α1 antibody for native collagen (Novus Biologics, Oakville, ON Canada) and placed on a shaker table at 4° C. for 24 hours. Samples were then rinsed for 3×15 minutes in PBS at which point a solution of 1% BSA PBS and 1:20000 Fluoro 549 IgG goat-anti-mouse (Novus Biologics, Oakville, ON Canada) were added to the samples and incubated in the dark on a shaker table at 4° C. for 20 h. Afterwards three 15-minute PBS washes were done and samples were then left hydrated in PBS and imaged.

Immunofluorescence Imaging

Immunofluorescence images were acquired over a 4 second exposure using a 20× objective lens on a Nikon™ Eclipse™ Ti epifluorescence microscope. Glass slides containing the stained strands were imaged while hydrated in PBS. All images were acquired with pixel dimension of 170 nm. Images were processed in ImageJ™ software. Strand diameter was measured at three locations along each strand using the line tool. The average of these measurements was used as a normalization factor for the average integrated intensity of each strand as selected using the box tool.

Second Harmonic Generation

Second harmonic generation (SHG) imaging of PEO-collagen strands before and after washing with PBS was performed on a home-built system. A 1030 nm wavelength ultrafast pulsed laser (Femtolux™ 3, Ekspla) set to 250 fs pulse duration and 5 MHz repetition rate was raster scanned across the sample using a pair of galvanometric scan mirrors (ScannerMAX™, Pangolin™ Laser Systems Inc.) with a pixel dwell time of 6 µs. SHG signal was collected in the forward scattering geometry using a custom 0.8 NA objective, filtered (87-789 and 48-637, Edmund Optics Inc.), and detected with a photon counting photomultiplier tube (H10682-210, Hamamatsu Photonics K.K.). The laser was focused on the sample using an air immersion microscope objective (20×0.8 NA, Zeiss™) just after it passed through a liquid crystal polarization retarder (LCC1223-C, Thorlabs, Inc.) and a quarter waveplate (WPMP4-22-BB-1030, Karl Lambrecht Corp.), which were used to alter the polarization of the laser. Eight SHG signal images were acquired per strand sample with laser polarization rotation of 22.5° between each image.

Figure 10:
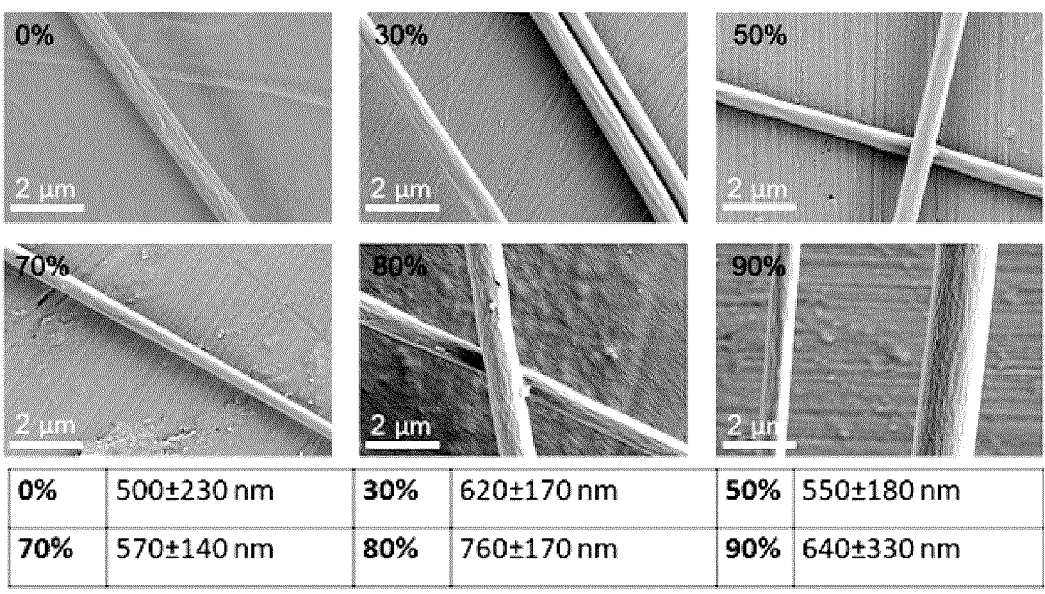
FIG. 10 depicts SEM images of PEO-collagen strands prepared from solutions with % dry mass fraction of collagen presented in the top left corner of each image. Average strand diameter with standard deviation is presented in the table below the images (n=25).
Figure 11:
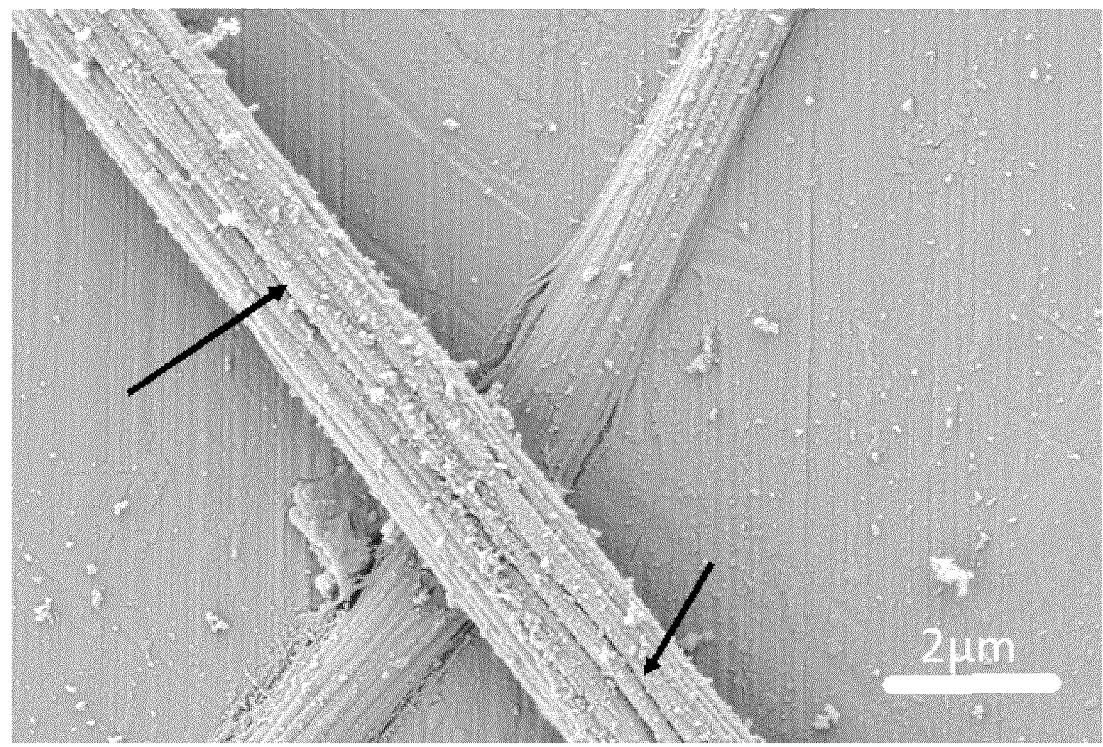
FIG. 11 depicts a SEM image of a strand that was formed with an initial composition of 90 wt % collagen and 10 wt % PEO in its dry form. After the polymer was removed by washing in PBS for 1 hour at 37° C., followed by rinsing in water, the collagen was critically point dried for SEM analysis. The resulting collagen strand contains sub-fibril structures that resemble those found in native collagen. Arrows show collagen fibril-sized sub-components to the strand.

Results and Discussion:

PEO-collagen strands comprising 0% collagen up to 90% collagen based on total weight of the strand were successfully fabricated using contact drawing of viscous PEO-collagen melts. Scanning electron microscopy (SEM) images (FIG. 10) of the strands revealed a consistent strand diameter (600±200 nm) independent of collagen content, similar to previous work using collagen dextran melts (International patent application WO 2018/137041 published Aug. 2, 2018). A progressive change in surface topography was observed as a function of collagen content, transforming from pronounced ridges and valleys for 0% and 30% collagen content (FIG. 10) to a smooth configuration for 50% and 70% collagen content (FIG. 10) and finally into a roughened ridged surface for 80% and 90% collagen content (FIG. 10). A high-resolution SEM image (FIG. 11) of a critical point dehydrated collagen strand comprising more than 90% collagen shows longitudinal sub-fibrillar structures.

Figure 12:
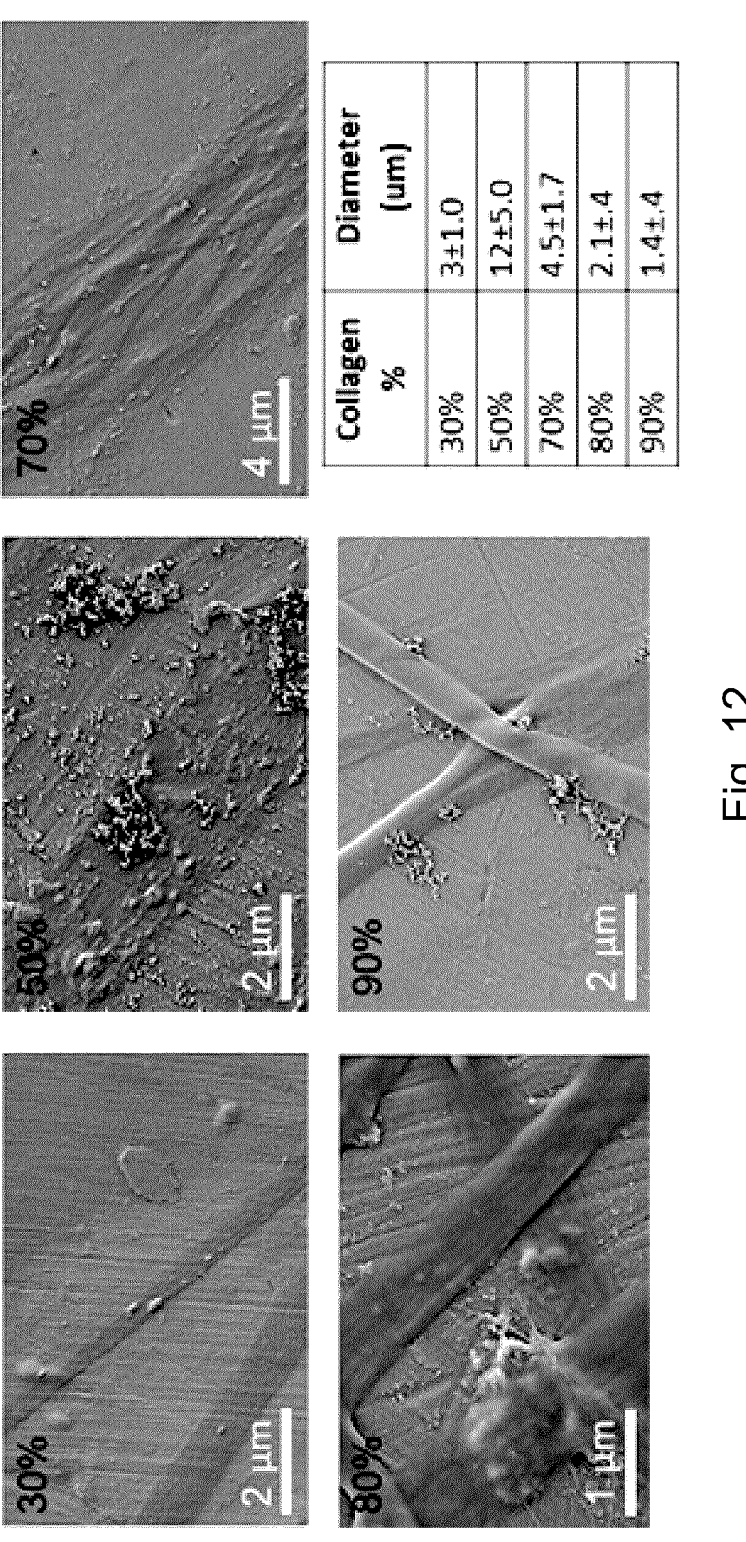
FIG. 12 depicts SEM images of PEO-collagen strands which have undergone a 1-hour PBS wash, three consecutive water rinses, and drying under air flow. The % dry mass fraction of collagen in the strand-forming solution for the strands in each image are presented in the top left of the image. Low collagen content strands have a ribbon-like appearance while high collagen content strands retain a structure having a rounder cross-section. Average strand diameter with standard deviation is presented in the table in the bottom right (n=25).

Upon hydration in a fiber forming buffer (FFB), e.g., PBS or a variation thereof, for 1 hour and subsequent drying, strand swelling was inversely proportional to collagen content (FIG. 12). Strands with lower collagen content appear as flat ribbons upon the SEM stub while higher concentrations retain their rounder architecture (FIG. 12) following rehydration and subsequent dehydration. In both dehydrated and critical point dehydrated samples the fibril sub-structure of the strands persists (FIG. 11) suggesting collagen strand diameter is more conserved than ordered lateral molecular packing, and the two are not codependent.

Figure 13:
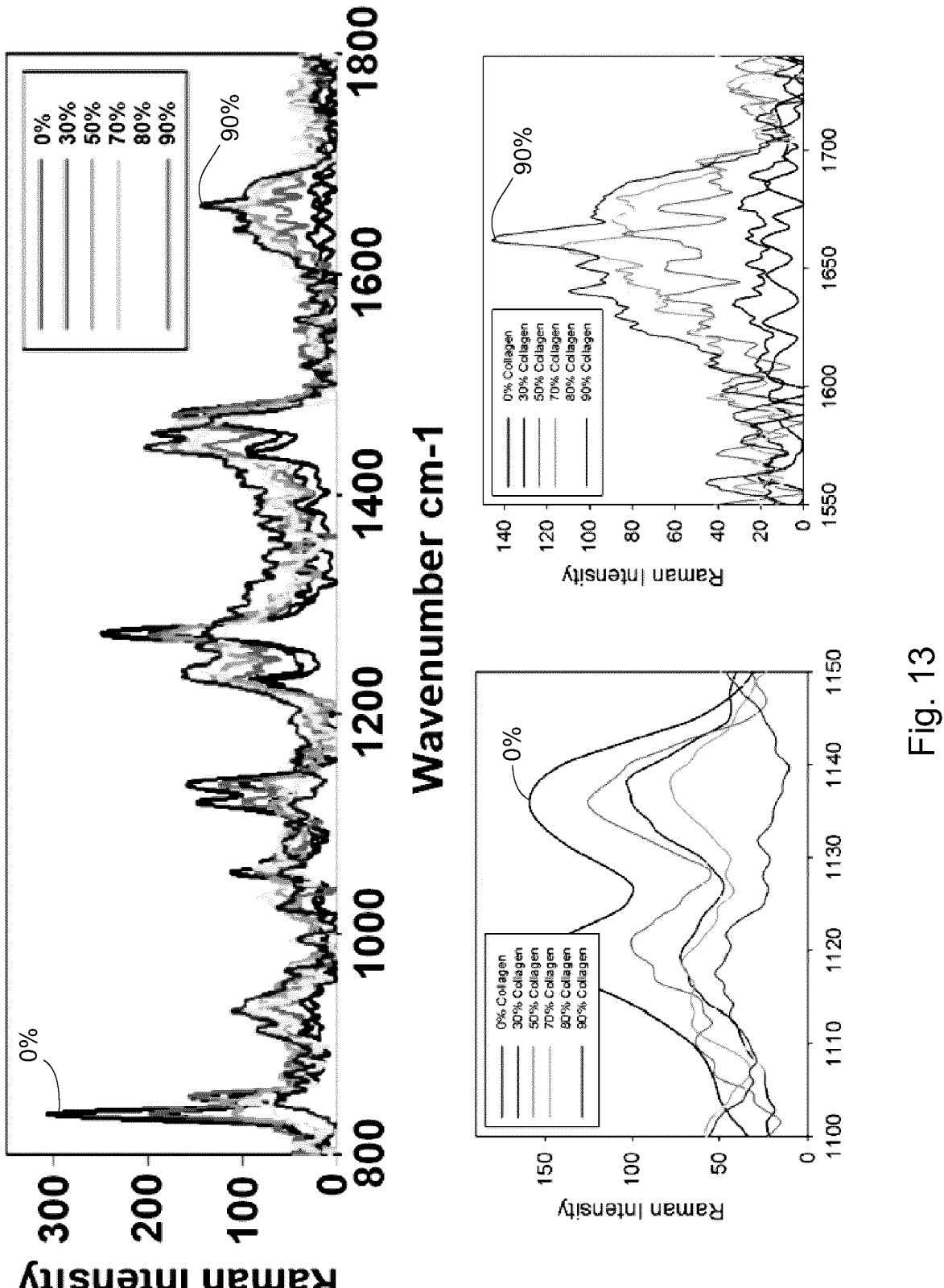
FIG. 13 depicts summation Raman spectra (top) of strands formed from a viscous PEO solution and a solution with a % dry mass fraction ranging from 0 to 90% collagen. Integrals of the spectra between 1100-1150 cm$^{-1}$ (bottom left) and 1550-1740 cm$^{-1}$ (bottom right) represent PEO and collagen content, respectively.
Figure 14:
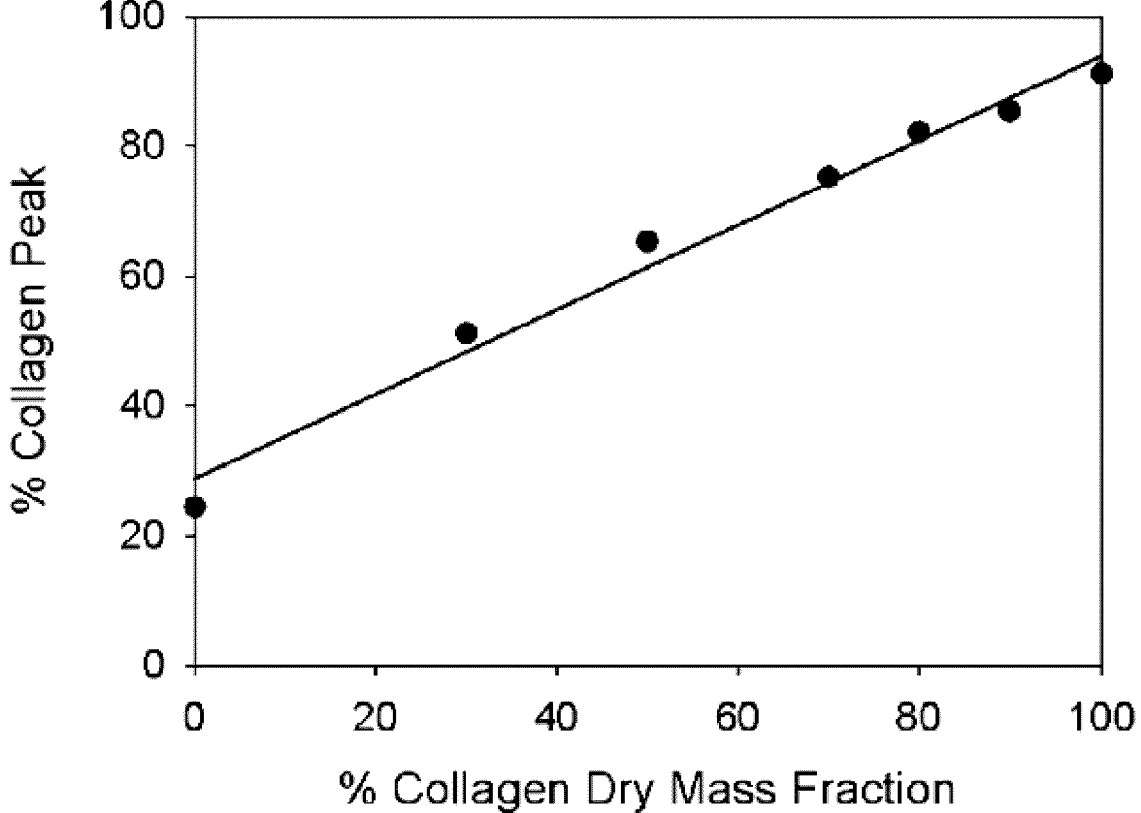
FIG. 14 depicts a graph of the relative component of the summation of the PEO and Raman peak integral from the Raman summation spectra of FIG. 13. The presence of the collagen peak compared to the PEO peak scales linearly with the % dry mass fraction of collagen in the respective strand-forming solution. This demonstrates control over strand collagen content based on collagen content within the strand-forming solution.

Collagen content and organization were measured using Raman spectroscopy, immunofluorescence imaging and second harmonic generation (SHG). Raman spectra of dry PEO-collagen strands show a clear transition from a PEO dominated spectra for 0% strands to a collagen dominated spectra for 90% collagen strands. This is clearly exhibited by the decrease in the PEO specific peak at 1100-1150 cm$^{-1}$ with increasing collagen content (FIG. 13 bottom left) and the corresponding increase in the amide I, collagen specific peak at 1550-1740 cm$^{-1}$ (FIG. 13 bottom right). The corresponding linear relationship between collagen content with the prevalence of the amide peak is indicative of the strands having the same dry mass fraction of collagen and PEO as the viscous solution they are pulled from (FIG. 14). Furthermore, following a 1 hr wash in PBS at room temperature and subsequent triple rinse with water, 90% collagen strands exhibited an increase in collagen to PEO signaling which corresponded to the predicted value from the fit linear relationship from non-hydrated PEO-collagen strands. This indicates that upon rinsing, The PEO is solubilized from the strand, leaving a 100% collagen strand in place.

Figure 15:
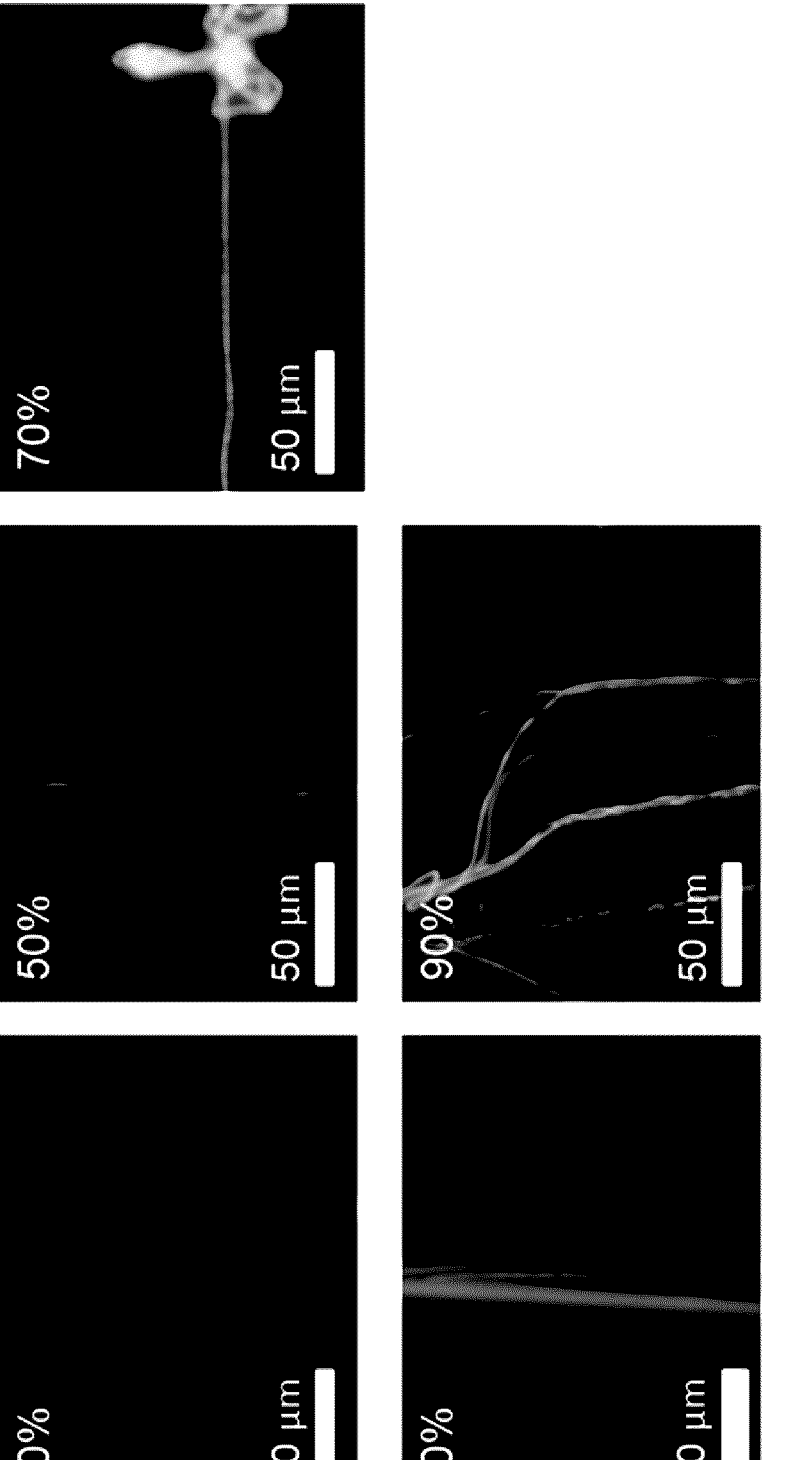
FIG. 15 depicts immunofluorescence images of PEO-collagen strands stained for native structure Coll ($\alpha$1). The % dry mass fraction of collagen in the strand-forming solution for the strands in each image are presented in the top left of the image.

The binding of mouse-anti-collagen|α1 antibody for native collagen to all PEO-collagen strands following hydration demonstrate the conservation of native molecular structure of collagen following the strand forming process (FIG. 15). The successful preparation of immunofluorescent samples highlights the insoluble nature of the strands as the process required no less than 60 hours in a hydrated state prior to imaging. This degree of hydration stability has not been exhibited by electrospinning methodologies in the absence of non-aqueous solvents or without the addition of cross-linkers.

Figure 16:
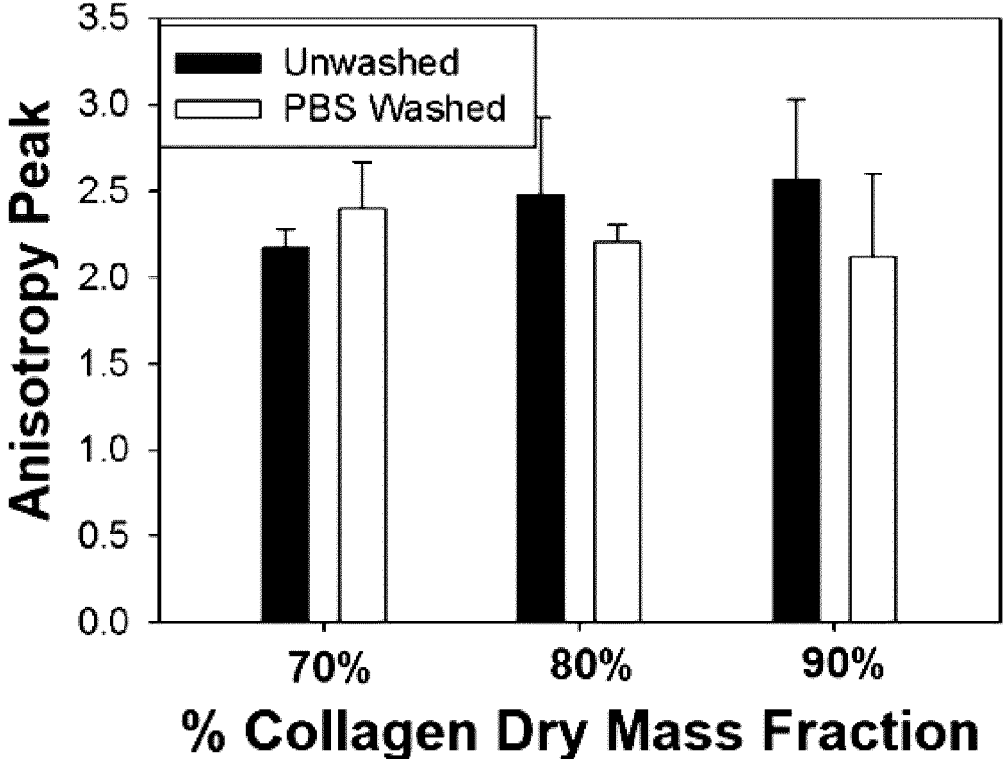
FIG. 16 depicts a graph of second harmonic generation (SHG) anisotropy peaks for dry and PBS washed PEO-collagen strands demonstrating collagen alignment in the strands along their longitudinal axis.

SHG anisotropy distributions for strands containing 70%, 80% and 90% collagen were acquired both before and after being washed with PBS. No significant variation was observed between sample groups (FIG. 16), but the average of the anisotropy distribution demonstrates molecular alignment within the strands. SHG signal was not obtained for strands below 70% collagen due to PEO having an absorbance band overlapping the output of the incident laser in the SHG system.

Contact drawing of long PEO-collagen strands has been successfully accomplished from viscous aqueous solutions compressed between two substrates. The strands formed via contact drawing ranged from pure PEO up to 90% collagen, can be sub-micron in diameter and up to meters in length, demonstrate anisotropic native collagen structures, are insoluble, and are non-denatured collagen molecules as confirmed via SEM, immunofluorescence imaging, Raman spectroscopy, and second harmonic generation. The high through-put (13 km/s) and control of strand alignment lends these strands to the production of non-woven and woven textiles for a variety of uses, for example for cell culture and regenerative medicine, while replicating a non-toxic extracellular matrix (ECM) environment.

Figure 17:
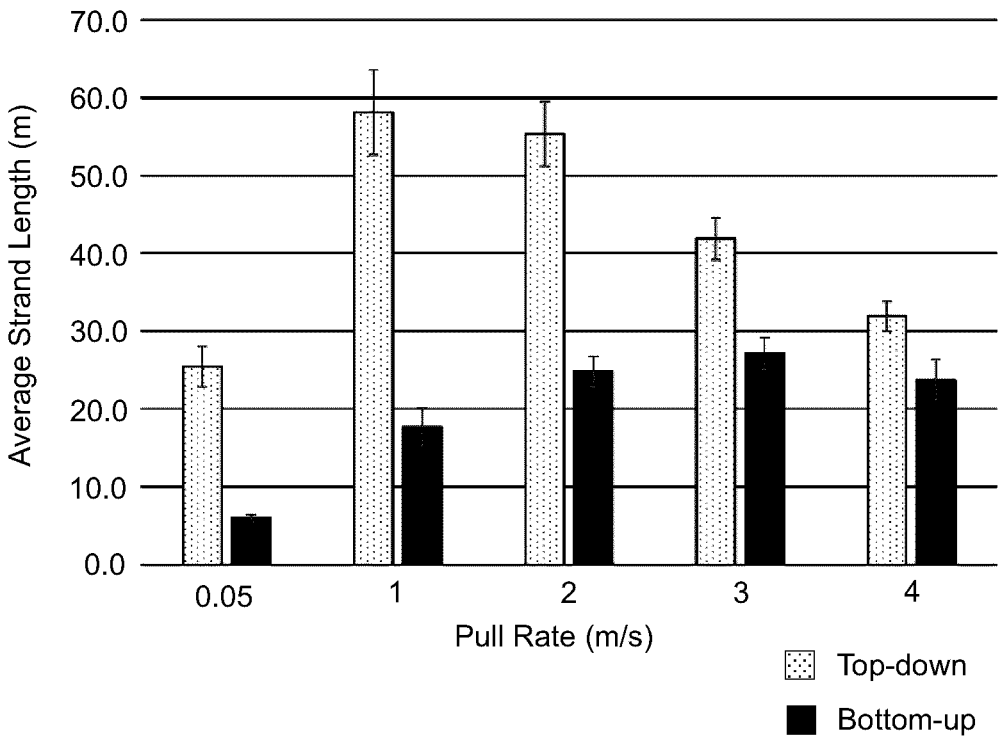
FIG. 17 depicts a graph of pull rate (spin rate) (m/s) vs. average length for multifilament strands of PEO/collagen pulled from a pre-strand composition comprising 8.5 wt % of 1 MDa PEO and 0.6 wt % of collagen in 10 mM aqueous HCl solvent in top-down and bottom-up orientations.

Example 4: Production of Collagen Strands with 1 MDa Poly(Ethylene Oxide) Scaffold Polymer In one experiment, PEO/collagen multifilament strands were pulled from a pre-strand composition comprising 8.5 wt % 1 MDa PEO and 0.6 wt % collagen. The strands were pulled at five different spin rates of 0.5 m/s, 1 m/s, 2 m/s, 3 m/s, and 4 m/s in a top-down and a bottom-up multifilament strand manufacturing setup with 5 replicates each. FIG. 17 shows the results. It is apparent from FIG. 17 that spin cones are directly affected by the force of gravity. The placement of the pre-strand composition reservoir and how the multifilament strands are created is important. At a pull rate of 1 m/s using a top-down orientation, the spin cones appear to be most stable and create the longest strand length. However, at higher speeds, gravity elongates the spin cones too much, which results in an absence of spin cone and shorter fiber lengths. When the pre-strand composition reservoir was placed so that strands are pulled upward against gravity, spin cones tended to collapse and "relax" back into the bulk pre-strand composition breaking the nascent strand.

Figure 18:
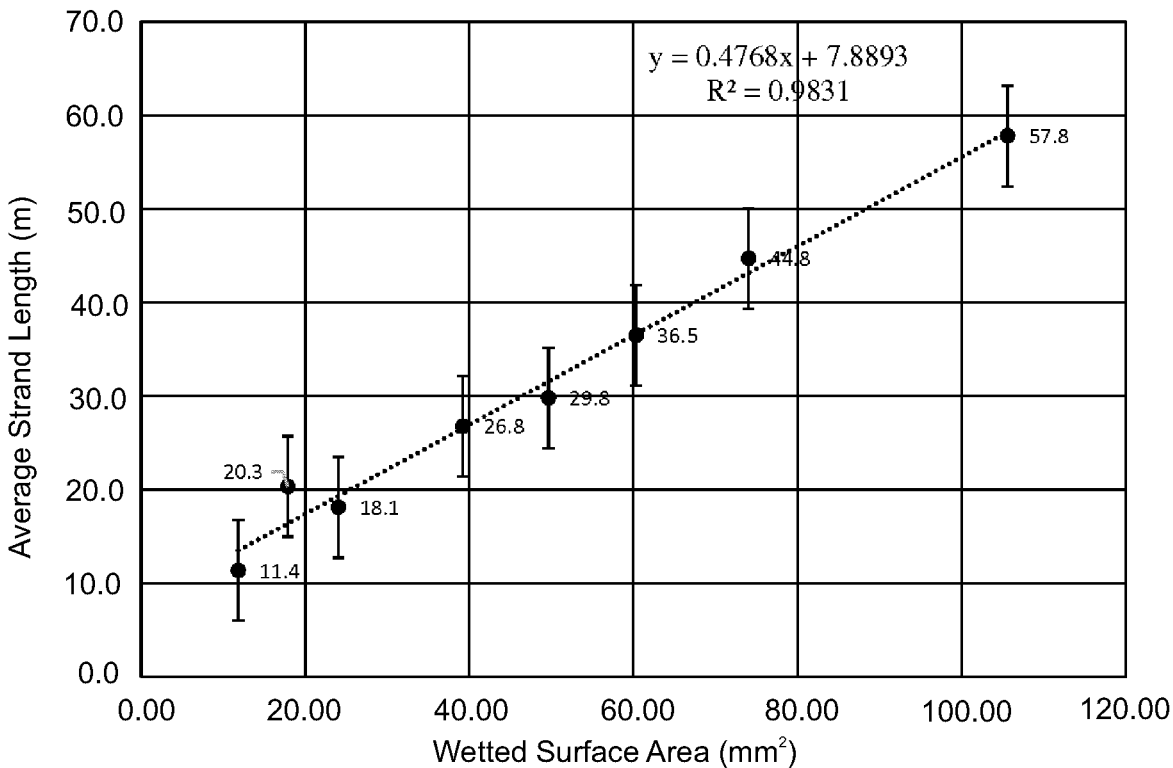
FIG. 18 depicts a graph of wetted surface area (mm$^2$) vs average strand length (m) showing the effect of changing pin diameter on average strand length for PEO/collagen multifilament strands.

In another experiment, collagen/PEO multifilament strands were pulled from a pre-strand composition comprising 8.5 wt % 1 MDa PEO and 0.6 wt % collagen. The effect of pin diameter and depth of pin submergence in the pre-strand composition on spin cone stability and strand length were explored. Pin arrays were designed on Onshape™ software and printed using B9 Creator V1.2 3D printer. Pin diameters were tested in the ranges between 0.5 mm and 4 mm and were immersed 7.4 mm into the pre-strand composition. FIG. 18 shows a linear relationship between wetted surface area and average strand length, where each point represents an average of 10 replicates. When expressed as wetted surface area, the longest strands were produced with a wetted surface area of 105.6 mm³ (2.4 mm pin diameter and 7.4 mm immersion into the pre-strand composition). The pin diameter, pin height and reservoir depth can be modified according to the required wetted surface area for desired strand length calculated based on the equation: y=0.4768x+7.8893, where y is the average strand length in meters and x is the wetted surface area in mm². The optimized pin architecture also involves setting the distance between each pin. If the pins are placed too close together, the strands combine and disrupt the spinning process. To avoid combining, the center-to-center spacing should be at least 2 times the pin diameter.

Figure 19A:
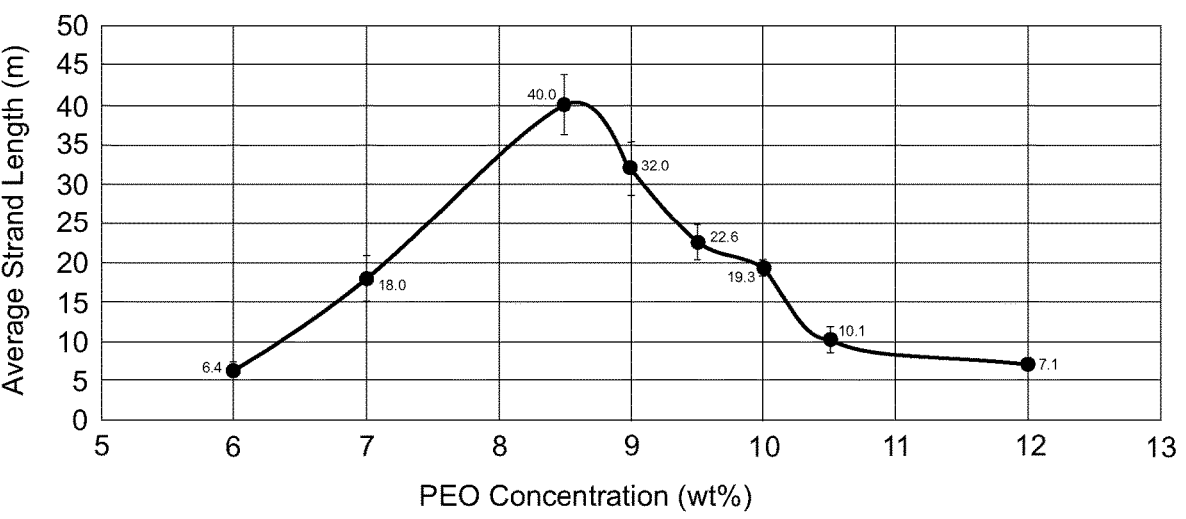
FIG. 19A depicts a graph of PEO concentration (wt %) vs. average strand length (m), showing the effect of changing PEO concentration in the pre-strand composition on average strand length for PEO/collagen multifilament strands.

In another experiment, PEO/collagen multifilament strands were pulled from a pre-strand composition comprising 1 MDa PEO at various concentrations and at constant 0.6 wt % collagen. Pull rates and pin architectures were the same in each. Thus, the effects of the concentration of PEO in the pre-strand composition on spin cone stability as defined by average strand length was examined. The amount of PEO was varied between 6 and 12 wt % as follows: 6 wt %, 7 wt %, 8.5 wt %, 9 wt %, 9.5 wt %, 10 wt %, 10.5 wt % and 12 wt %. The results are shown in FIG. 19A, where each point represents the average of at least seven individual strands. Error bars are 1 standard error of the mean. It is apparent from FIG. 19A that the addition of collagen to the PEO scaffold polymer also results in an optimization curve in which the strand length peaks between certain higher and lower values of PEO concentration. A similar improvement of strand length as PEO concentration increases, then a shortening in strand length at higher PEO concentration is observed with PEO alone (see FIG. 8C).

Figure 19B:
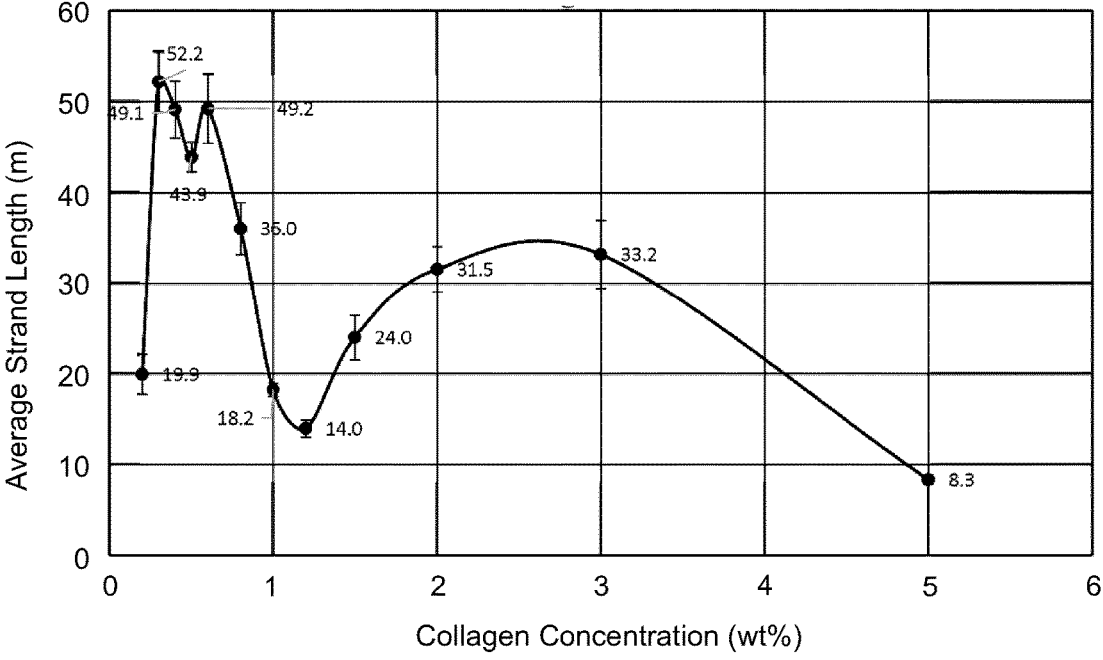
FIG. 19B depicts a graph of collagen concentration (wt %) vs. average strand length (m) showing the effect of changing collagen concentration in the pre-strand composition on average strand length for collagen/PEO multifilament strands.
Figure 19C:
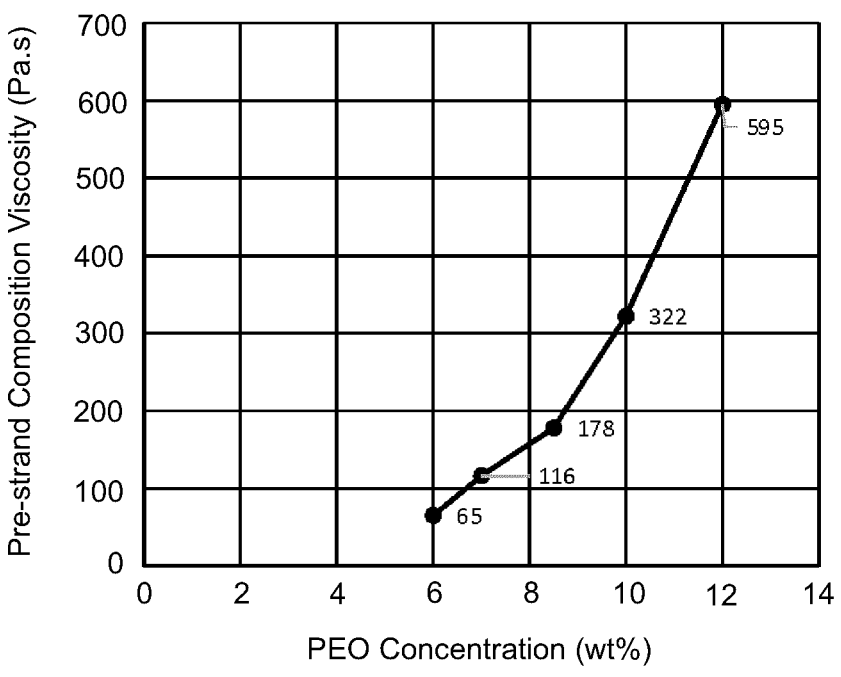
FIG. 19C depicts a graph of PEO concentration (wt %) vs pre-strand composition viscosity (Pa·s) showing the effect of increasing PEO concentrations on pre-strand composition viscosity in the presence of a constant collagen concentration of 0.6 wt %.
Figure 19D:
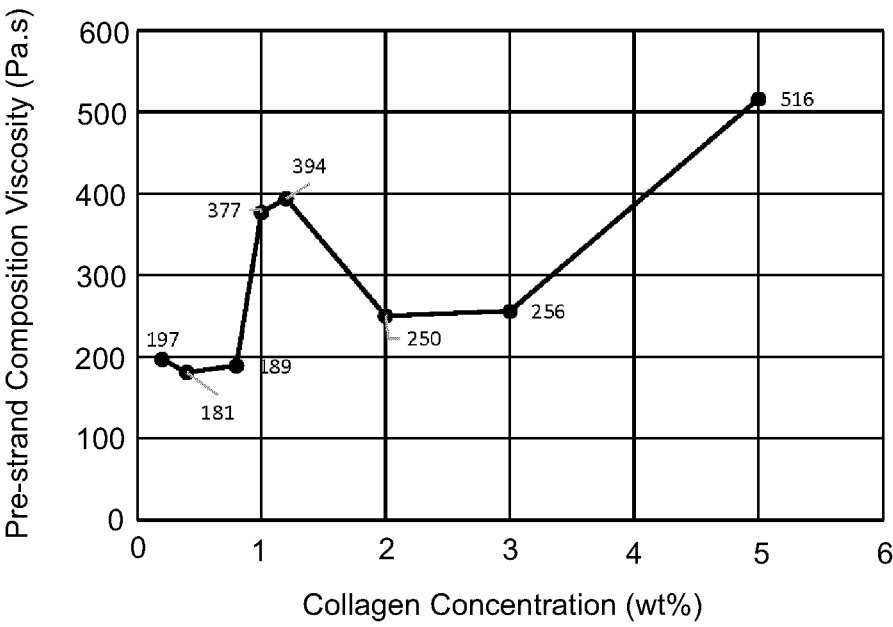
FIG. 19D depicts a graph of collagen concentration (wt %) vs pre-strand composition viscosity (Pa·s) showing the effect of increasing collagen concentration on pre-strand composition viscosity in the presence of constant PEO concentration of 8.5 wt %.

In another experiment, PEO/collagen multifilament strands were pulled from a pre-strand composition comprising 8.5 wt % of 1 MDa PEO and varying concentrations of collagen. Pull rates and pin architectures were the same in each. Thus, the effects of the concentration of collagen in the pre-strand composition on spin cone stability as defined by average strand length was examined. The amount of collagen was varied from 0.2 to 5 wt % as follows: 0.2 wt %, 0.3 wt %, 0.4 wt %, 0.5 wt %, 0.6 wt %, 0.8 wt %, 1 wt %, 1.2 wt %, 1.5 wt %, 2 wt %, 3 wt % and 5 wt %. The results are shown in FIG. 19B, where each point represents the average of at least seven individual strands. Error bars are 1 standard error of the mean. It is apparent from FIG. 19B that the effect of collagen concentration on average strand length is biphasic in the concentration range examined. Referring to FIG. 19D, it is apparent that viscosity of the pre-strand composition does not increase linearly with an increase in collagen concentration. At a viscosity of 150-250 Pa·s, e.g., 0.4 wt %, 0.8 wt %, 2 wt %, and 3 wt % collagen concentration, longer fibers are formed. At viscosities greater than 250 Pa·s, e.g., 1 wt %, 1.2 wt %, and 5 wt % collagen concentration, the average fiber length decreases. At very low collagen concentrations, e.g., 0.2 wt %, this response is not observed.

FIG. 19A and FIG. 19B together indicate that the concentration of all polymeric materials including the PEO and the collagen is preferably in a range of 8-13 wt %, based on total weight of the pre-strand composition, in order to produce the longest strands.

Figure 19E:
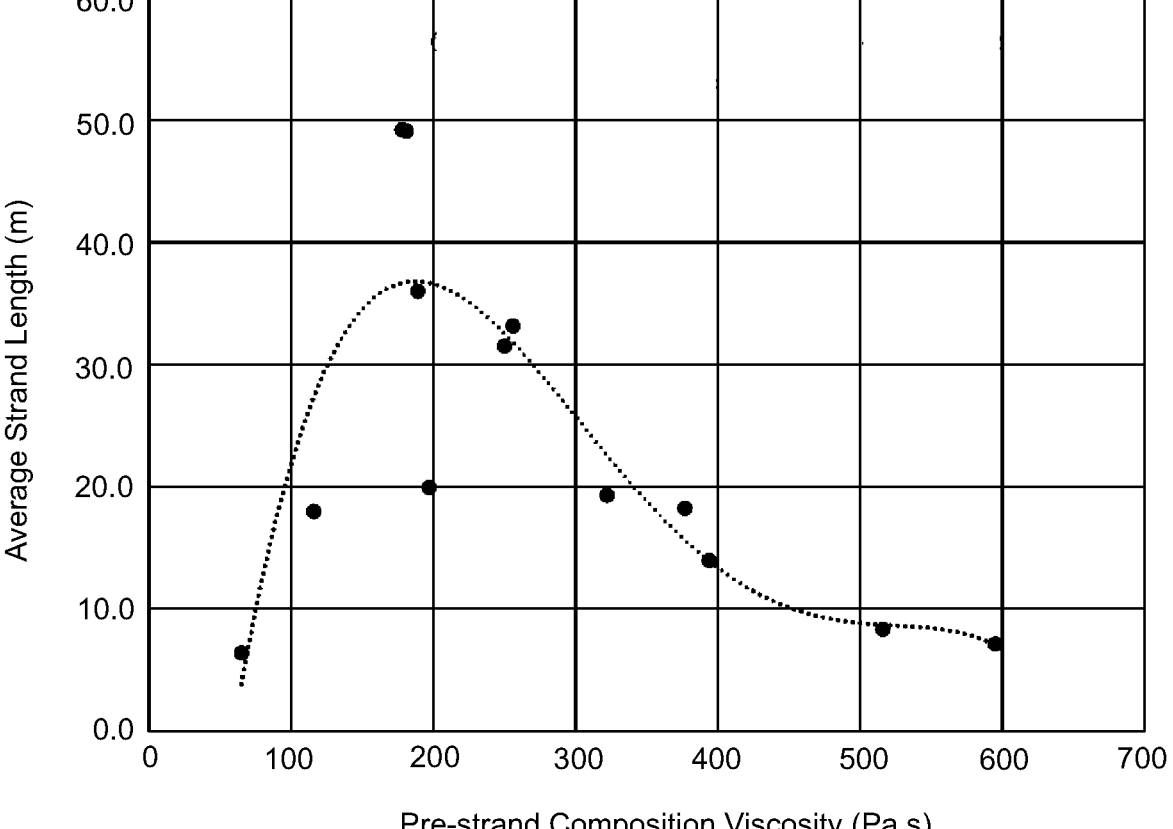
FIG. 19E depicts a graph of pre-strand composition viscosity (Pa·s) vs average strand length (m) showing optimization of fiber length through changes in pre-strand composition viscosity.

In another experiment, the viscosities of the above pre-strand compositions were measured using a StressTech™ HR rheometer (ATS RheoSystems™) in a parallel plate configuration with a 40 mm diameter plate and a 0.5 mm gap. Samples were loaded using a spatula, with excess pre-strand composition removed when the plate gap was achieved. Before measurement, samples held for 30 seconds then subjected to pre-shear at 0.1 s⁻¹ for 30 seconds. Temperature was 20° C. Samples were subjected to a shear rate sweep between 0.1 and 100 s⁻¹ and repeated two times with new samples and expressed as an average. All samples showed non-Newtonian shear thinning behavior. FIG. 19C shows how the viscosity of the pre-strand composition changes as a function of increasing PEO concentration when collagen concentration is held constant at 0.6 wt %. FIG. 19D shows how viscosity of the pre-strand composition changes as a function of increasing collagen concentration when PEO concentration is held constant at 8.5 wt %. FIG. 19E shows the relationship between viscosity of the pre-strand composition and average fiber length. A polynomial regression: q=−6E-09p⁴+1E-05p³−0.0059p²+1.2831p−57.525, where q is the average strand length in meters and p is the viscosity of the pre-strand composition in Pa·s, expresses this relationship mathematically, where fiber length can be predicted or "tuned" by adjusting the viscosity of the pre-strand composition. For example, the longest fibers are produced when viscosity of the pre-strand composition is set to 178 Pa·s.

Figure 20:
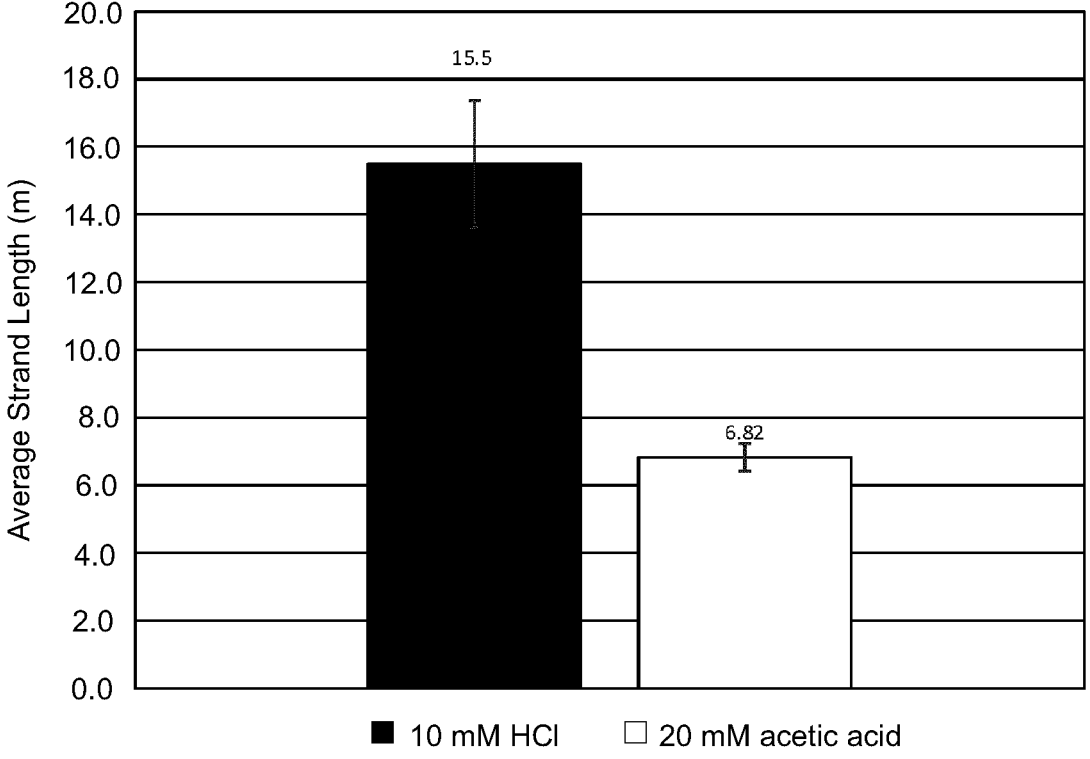
FIG. 20 depicts a graph comparing average strand lengths (m) of multifilament PEO/collagen strands pulled from 20 mM acetic acid and 10 mM HCl.

In another experiment, the effect of acid solvent selection on average strand length was examined. Two pre-strand compositions were prepared with 8.5 wt % 1 MDa PEO and 0.6 wt % collagen in a 20 mM acetic acid or 10 mM HCl solvent. These are common collagen solvents used in the industry. Fibers were produced from each pre-strand composition using a variable speed winder at pull rate of 1 m/s and the average length was measured based on 10 replicates. The pin architecture was the same in each. The effect of solvent selection was significant as seen in FIG. 20. Under the conditions tested, hydrochloric acid was a superior solvent in that it produced strands having an average strand length more than 2 times longer than strands produced from acetic acid.

For the experiments in Example 4, the ambient conditions of the room were recorded with a TP49 Thermo Pro™ Hygrometer. The ambient relative humidity was in a range of 25-30% and the temperature was in a range of 26-32° C.

Example 5: Production of a Non-Woven Fabric from Poly(Ethylene Oxide) Strands

Poly(ethylene oxide) (PEO) strands were produced by pulling the strands from an aqueous solution of PEO in water using an apparatus as described in connection with FIG. 2 utilizing process conditions determined by the methodology described in Example 1. The strands were formed into a non-woven fabric by layering successive pulled fibers produced using a multi-pin nucleation element, although other conventional technology can be used. The fabric was assessed for potential usefulness in the fabrication of NIOSH respirator approval "N95" filter masks.

Figure 21A:
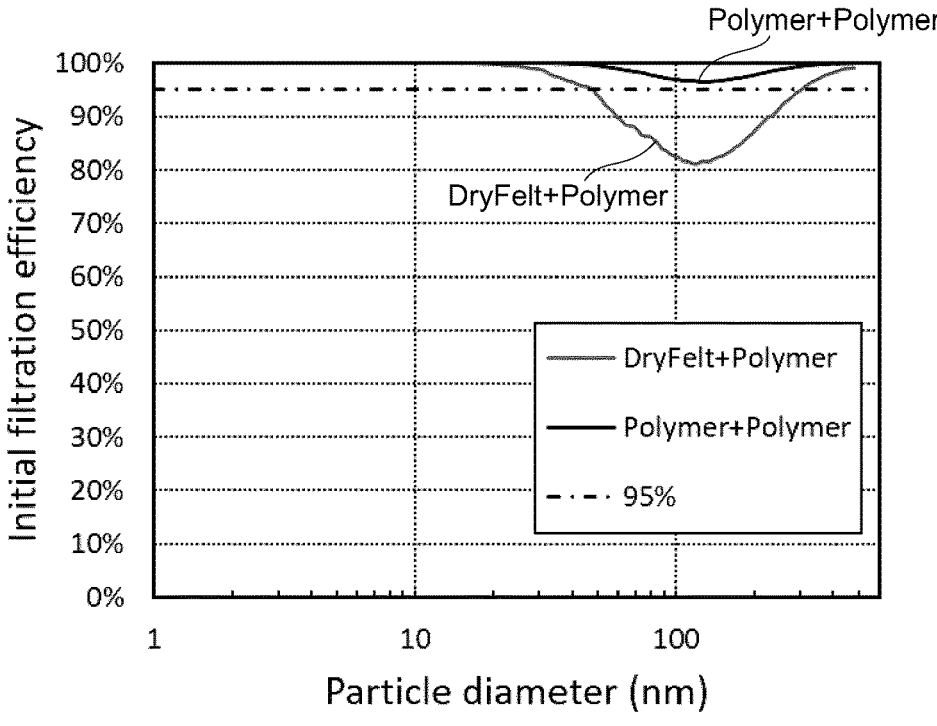
FIG. 21A depicts a graph of initial filtration efficiency (%) vs. particle diameter (nm) for a non-woven fabric made of PEO strands produced in accordance with the present process.
Figure 21B:
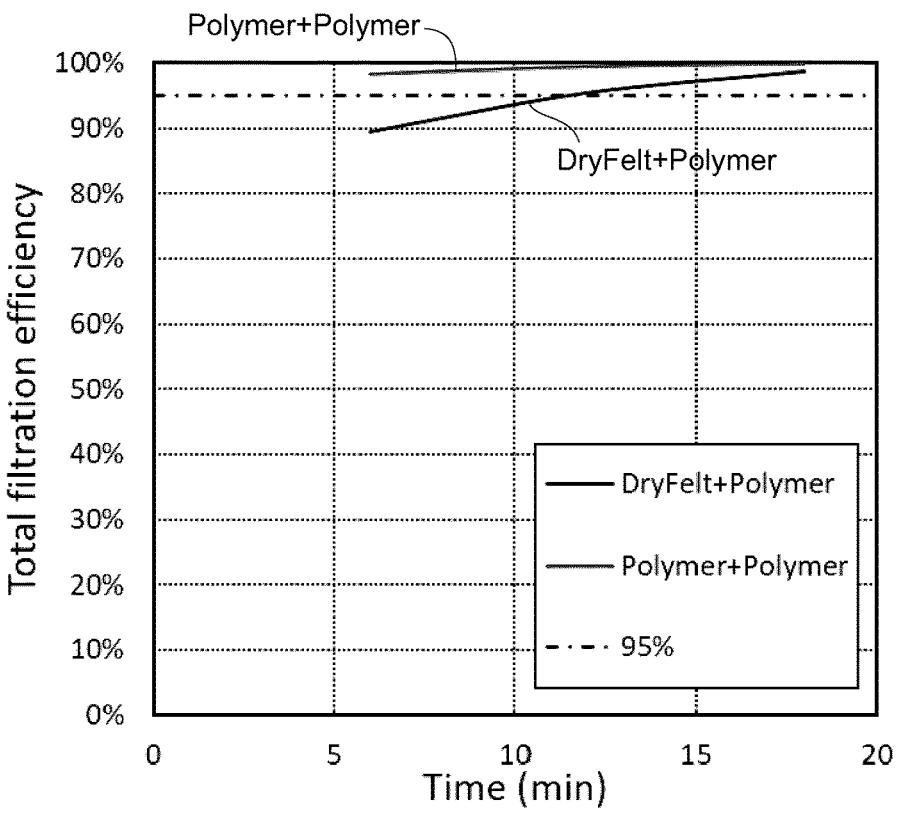
FIG. 21B depicts a graph of total filtration efficiency (%) vs. particle diameter (nm) for the non-woven fabric of FIG. 21A.

FIG. 21A depicts a graph of initial filtration efficiency (%) vs. particle diameter (nm) for the non-woven fabric. Polymer+Polymer represents the non-woven fabric made from PEO alone. As seen in FIG. 21A, the initial filtration efficiency for the non-woven fabric is over 98% across the entire particle diameter range of 1 nm to 500 nm. Such an efficiency is above the 95% efficiency mark (broken line) required for an N95 mask, and better than a fabric utilizing dry felt and polymer (DryFelt+Polymer). The DryFelt+Polymer is a single polymer layer plus a felt comprised of 60% wt wool and 40% wt linen. As seen in FIG. 21B, the filtration efficiency (%) of the non-woven fabric is not lost following a particulate load equivalent to the testing protocol for N95 masks.

Example 6: Production of Poly(Ethylene Oxide)-Gelatin Strands

Gelatin is composed of hydrolyzed collagen peptides with low molecular weight, 3-5 kDa (Leon-Lopez A, et al. Molecules. 2019, 24, 4031, 16 pages). This example illustrates the application of contact drawing strand formation with small peptides with random coil secondary structure. Poly(ethylene oxide)-gelatin from bovine skin Type B (PEO-gelatin) strands were produced by the process in a manner similar to the PEO-collagen strands in Example 2. The strands were formed from a solution containing 5 wt % PEO ($M_w$=1,000 kDa) and 5 wt % gelatin in acetic acid. For comparison, strands were also formed from a viscous PEO solution in water.

Figure 22:
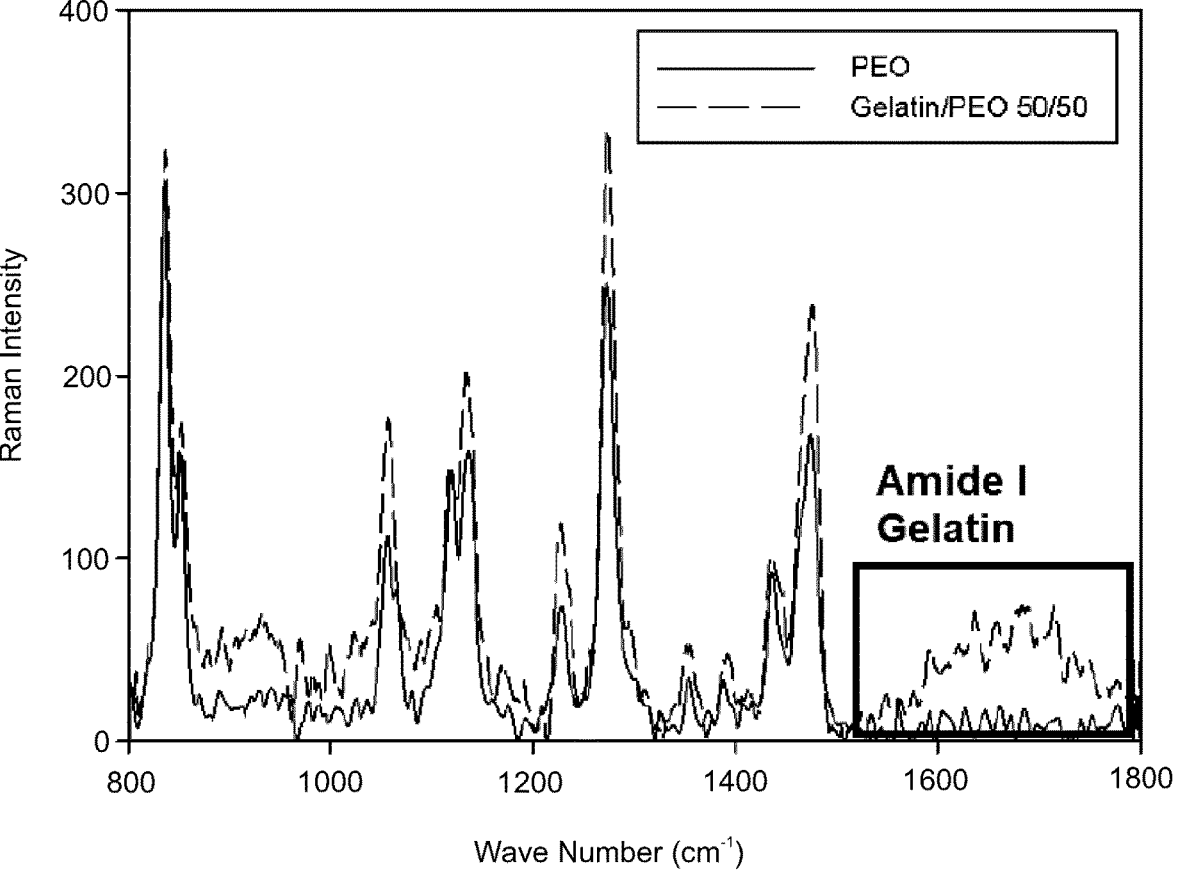
FIG. 22 depicts summation Raman spectra of strands formed from a viscous PEO solution and a solution containing equal amounts of PEO and Gelatin. The PEO-Gelatin spectrum has a broad peak in the Amide I region which is not found in the pure PEO strand spectrum.

FIG. 22 depicts summation Raman spectra of PEO-gelatin strands. The PEO-Gelatin spectrum has a broad peak in the Amide I region which is not found in the pure PEO strand spectrum, thereby indicating the successful formation of a strand of gelatin supported on a strand of PEO.

Example 7: Production of Poly(Ethylene Oxide) Strands Supporting Citric Acid Poly(ethylene oxide) (PEO) strands were produced by the process in a manner similar to the PEO-collagen strands in Example 3, except that citric acid was incorporated into the PEO strands instead of collagen. Strands were formed from 10 wt % PEO ($M_w$=1,000 kDa) solutions containing pure water, 0.1 M citric acid in water and 1 M citric acid in water. The pH of the pre-strand compositions was measured prior to strand formation (Before). Approximately 200,000 strands, 30 cm in length, were pulled from each of the pre-strand solutions and rehydrated in 10 ml pure water, at which point the pH of the resulting solutions was measured again (After).

Figure 23:
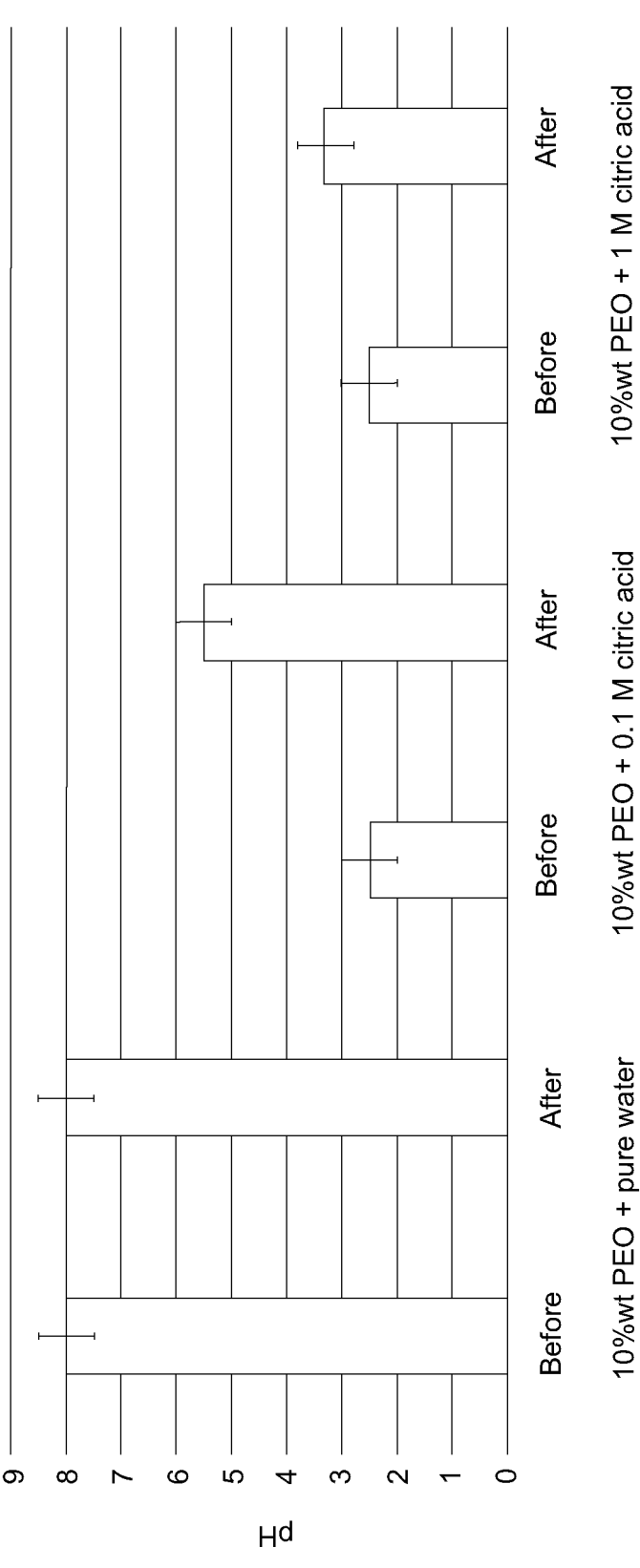
FIG. 23 depicts a graph showing extent of incorporation of citric acid into PEO strands. The pH of the pre-strand compositions of 10 wt % PEO with 90 wt % of pure water; 0.1 M citric acid; and, 1 M citric acid, was measured prior to strand formation (Before). Approximately 200,000 strands, 30 cm in length, were pulled from the pre-strand solution and rehydrated in 10 ml pure water, at which point the pH of the resulting solution was measured again (After).

As seen in FIG. 23, the pH of the pre-strand solution (Before) and the rehydrated strand solution (After) for the PEO strand pulled from the solution in pure water remained unchanged at pH 8. In contrast, for strands pulled from the pre-strand solutions containing citric acid, the pH of the rehydrated strand solution in both cases was less than 6, indicating that in both cases at least some of the citric acid was incorporated into the PEO strand during the strand formation process. Further, the pH of the rehydrated strand solution for the 1 M citric acid case is lower than in the 0.1 M citric acid case, indicating that a greater loading of the citric acid in the PEO arises from a pre-strand solution that has a higher concentration of citric acid.

Example 8: Production of Poly(Ethylene Oxide) Strands Supporting Silver Nanoparticles Poly(ethylene oxide) (PEO) strands were produced by the process in a manner similar to the PEO-collagen strands in Example 3, except that silver nanoparticles were incorporated into the PEO strands instead of collagen. Strands were formed from pre-strand solutions of 10 wt % PEO ($M_w$=1,000 kDa) and 2,000 ppm silver nanoparticles (diameter=2 nm) in water.

Figures 24A, 24B:
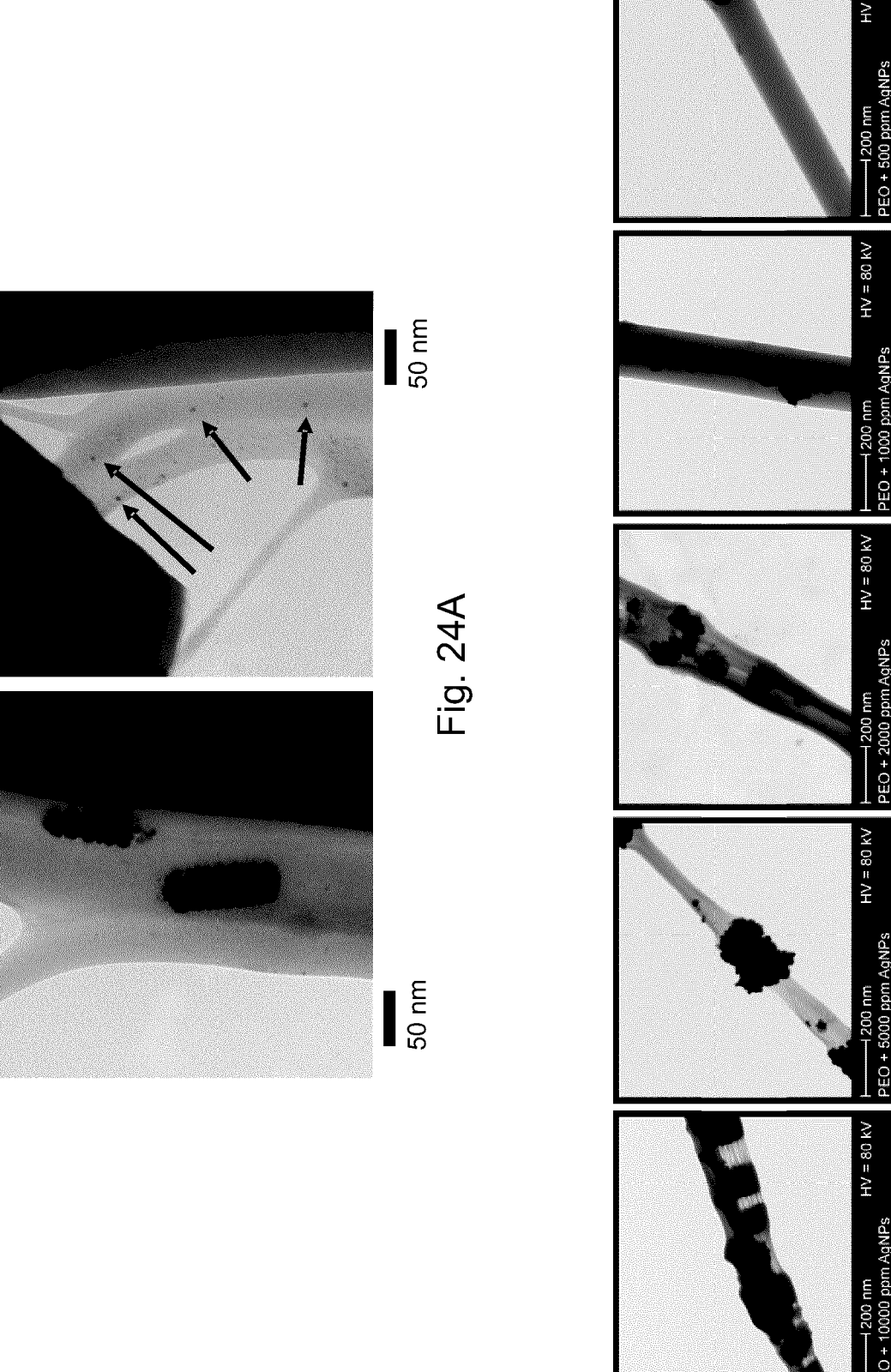
FIG. 24A depicts transmission electron microscopy images of 1 MDa PEO strands with 2 nm silver nanoparticles (seen as clusters in the left panel, and indicated by arrows in the right panel) incorporated with the strands. The pre-strand composition comprised 10 wt % 1 MDa PEO and a 2000 ppm silver nanoparticle concentration in water.
FIG. 24B depicts transmission electron microscopy images of 1 MDa PEO strands having diameters of less than 200 nm with 2 nm silver nano-particles incorporated with the strands.

As seen in FIG. 24, the PEO strands has both clusters of the silver nanoparticles (left panel) and non-clustered silver nanoparticles (right panel) incorporated thereon. As seen in FIG. 24B, silver nanoparticles are also incorporated with PEO strands having strand diameters of less than 200 nm.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A process for producing a multifilament polymer strand of polyethylene oxide (PEO) and collagen, the process comprising:

inserting a nucleation element into a pre-strand composition comprising PEO and collagen mixed with a solvent; and, withdrawing the nucleation element from the pre-strand composition so that a multifilament strand comprising PEO and collagen filaments is pulled by the nucleation element from the pre-strand composition.

2. The process of claim 1, wherein the pre-strand composition has a viscosity in a range of 100-400 Pa·s.

3. The process of claim 1, wherein the pre-strand composition has a viscosity in a range of 150-300 Pa·s.

4. The process of claim 1, wherein the PEO is present in the pre-strand composition in amount of at least 7 wt %, based on total weight of the pre-strand composition.

5. The process of claim 1, wherein the PEO is present in the pre-strand composition in amount of 7-14 wt %, based on total weight of the pre-strand composition.

6. The process of claim 1, wherein the PEO is present in the pre-strand composition in amount of 7-10 wt %, based on total weight of the pre-strand composition.

7. The process of claim 1, wherein the collagen is present in the pre-strand composition in amount of 0.2-9 wt %, based on total weight of the pre-strand composition.

8. The process of claim 1, wherein the collagen is present in the pre-strand composition in amount of 0.3-3 wt %, based on total weight of the pre-strand composition.

9. The process of claim 1, wherein the multifilament strand is pulled at a rate in a range of 0.5-4 m/s.

10. The process of claim 1, wherein the nucleation element has a surface, and the nucleation element is inserted into the pre-strand composition so that the surface of the nucleation element is wetted over a surface area of at least 11 mm$^2$.

11. The process of claim 1, wherein the nucleation element is one nucleation element in an array of spaced-apart nucleation elements, neighboring nucleation elements in the array having a center-to-center spacing that is at least 2 times a diameter of a thickest neighboring nucleation element.

12. The process of claim 1, wherein the solvent is an aqueous solvent.

13. The process of claim 1, wherein the multifilament polymer strand produced by the process has a strand length in a range of 0.01-100 m.

14. A process for producing a collagen strand, the process comprising:

inserting a nucleation element into a pre-strand composition comprising polyethylene oxide (PEO) and collagen mixed with a solvent;

withdrawing the nucleation element from the pre-strand composition so that a multifilament strand comprising PEO and collagen filaments is pulled by the nucleation element from the pre-strand composition; and, separating the PEO from the collagen in the multifilament strand to produce the collagen strand.

15. The process of claim 14, wherein the multifilament strand is pulled at a rate in a range of 0.5-4 m/s.

16. The process of claim 14, wherein the nucleation element has a surface, and the nucleation element is inserted into the pre-strand composition so that the surface of the nucleation element is wetted over a surface area of at least 11 $mm^2$.

17. The process of claim 14, wherein the nucleation element is one nucleation element in an array of spaced-apart nucleation elements, neighboring nucleation elements in the array having a center-to-center spacing that is at least 2 times a diameter of a thickest neighboring nucleation element.

18. The process of claim 14, wherein the solvent is an aqueous solvent.

19. The process of claim 14, wherein the multifilament strand has a strand length in a range of 0.01-100 m.

<div align="center">*   *   *   *   *</div>